US008931053B2

(12) United States Patent
Wang

(10) Patent No.: US 8,931,053 B2
(45) Date of Patent: Jan. 6, 2015

(54) METHOD AND APPARATUS FOR WIRELESS SECURITY ENHANCEMENT USING MULTIPLE ATTRIBUTES MONITORING, CONTINUOUS AND INTERLEAVED AUTHENTICATION, AND SYSTEM ADAPTATION

(71) Applicant: Xianbin Wang, London (CA)

(72) Inventor: Xianbin Wang, London (CA)

(73) Assignee: The University of Western Ontario, London, Ontario (CA)

( * ) Notice: Subject to any disclaimer, the term of this patent is extended or adjusted under 35 U.S.C. 154(b) by 7 days.

(21) Appl. No.: 13/727,786

(22) Filed: Dec. 27, 2012

(65) Prior Publication Data

US 2014/0040985 A1 Feb. 6, 2014

Related U.S. Application Data

(60) Provisional application No. 61/581,604, filed on Dec. 29, 2011.

(51) Int. Cl.
*H04L 29/06* (2006.01)
*H04W 12/06* (2009.01)
*H04L 27/26* (2006.01)

(52) U.S. Cl.
CPC .............. *H04W 12/06* (2013.01); *H04L 27/26* (2013.01)
USPC .................... 726/3; 726/23; 726/26; 713/168

(58) Field of Classification Search
CPC ..... H04W 12/12; H04W 12/06; H04W 88/08; H04W 12/04; H04W 12/00; H04L 63/08; H04L 63/1408; H04L 63/1441; H04L 63/1466
USPC .......... 726/3, 4, 22, 23, 26; 380/270; 713/168
See application file for complete search history.

(56) References Cited

U.S. PATENT DOCUMENTS

| 2004/0128563 | A1* | 7/2004 | Kaushik et al. ............... 713/300 |
| 2007/0201087 | A1* | 8/2007 | Saito ........................... 358/1.15 |
| 2009/0279626 | A1 | 11/2009 | Wang |
| 2009/0327736 | A1* | 12/2009 | Cam-Winget et al. ........ 713/181 |

OTHER PUBLICATIONS

C. E. Shannon, "Communication Theory of Secrecy Systems," Bell System Technical Journal, vol. 28, pp. 656-715, Oct. 1949.
H. Yang, F. Ricciato, S. Lu, and L. Zhang, "Securing a Wireless World," Proceedings of the IEEE, vol. 94, No. 2, pp. 442-454, Feb. 2006.

(Continued)

*Primary Examiner* — Joseph P Hirl
*Assistant Examiner* — John B King
(74) *Attorney, Agent, or Firm* — Brion Raffoul

(57) ABSTRACT

The present invention is an adaptive secure wireless communications system and method. Generally, the present invention may be operable to address challenges and threats to a secure communication session. The secure wireless communication system of the present invention may operate one or more of the following: multiple physical-layer attributes monitoring; multiple parameter confidence testing related to transceiver (Tx-Rx) specific environment and transmitter receiver hardware characteristics; continuous and interleaved authentication; and security enhancement using dynamic adaptation of the transmission system parameters based concurrent and/or conjugated transmission of data-carrying signal and security control information. The real-time physical-layer related monitoring and interaction between transmitter and receiver, using Tx-Rx related physical environment, of the present invention may effectively reduce many wireless security threats including interception and spoofing.

20 Claims, 10 Drawing Sheets

(56) References Cited

OTHER PUBLICATIONS

K. Bicakci and B. Talvi, "Denial-Of-Service Attacks and Countermeasures in IEEE 802.11 Wireless Networks," Computer Standards & Interfaces, vol. 31, No. 5, pp. 931-941, Sep. 2009.

B. Vaidya and H. Lim, "Secure Framework for Multipath Multimedia Streaming Over Wireless Ad hoc Network," IEEE WCNC 2009, pp. 1-6, Apr. 2009.

G. Thamilarasu, "Cross-Layer Design for Security in Wireless Ad Hoc Networks," Ph. D Dissertation, State University of New York, Jul. 2009.

Y. Sheng, K. Tan, G. Chen, D. Kotz, and A. Campbell, "Detecting 802.11 MAC Layer Spoofing Using Received Signal Strength," IEEE INFOCOM 2008, Apr. 2008, pp. 1768-1776.

M. Bogdanoski, P. Latkoski, A. Risteski, and B. Popovski, "IEEE 802.16 Security Issues: A Survey," 16th Telecommunications forum TELFOR, pp. 199-202, Nov. 2008.

* cited by examiner

METHOD AND APPARATUS FOR WIRELESS SECURITY ENHANCEMENT USING MULTIPLE ATTRIBUTES MONITORING, CONTINUOUS AND INTERLEAVED AUTHENTICATION, AND SYSTEM ADAPTATION

TECHNICAL FIELD

This invention relates in general to the field of wireless security enhancement and more particularly to wireless security enhancement incorporating one or more of the following: multiple attributes monitoring; continuous and interleaved authentication; and system adaptation.

BACKGROUND OF THE INVENTION

With rapid proliferation of advanced wireless communication networks and devices, traditional security and authentication practices face increasing challenge due to the broadcast and open nature of wireless communications. Both the protection of the privacy of each individual wireless user, and security of critical wireless infrastructures, have taken on increasingly important roles in recent times. The wide deployment of various wireless technologies and dramatic growth of user population have escalated the importance of these aspects of wireless communication.

In particular, the open nature of radio signal propagation and the transparent transmission parameters of the physical link involved in wireless communication create specific issues that must be addressed by wireless security. Security in conventional wireless communications has been considered to represent an issue to be addressed at the higher layers of the network protocol stack. Traditional authentication and cryptographic techniques have therefore undertaken the approach of focusing on higher layers of the network protocol stack.

In addition, most of the known deployed wireless communication systems and networks feature a transparent transmission scheme, which significantly increases the possibility of signal and data interception. Conventional prior art security techniques that provide a high level of security protection in a wired network are mostly inadequate in wireless communications, due to the lack of any direct physical association between the legitimate wireless users. Therefore wired security techniques cannot reduce the risks from the open air interface.

Traditional prior art security techniques are proved to be able to play an important role in combating many security threats, including both attacks similar to those in wired networks and those which are specific to the wireless environment. Due to the lack of a physical association between the subscriber and the wired network, wireless communication network function and operate without any physical connection and this means that the wireless environments have additional vulnerabilities not experienced by wired environments. These additional vulnerabilities include security threats. As a result, prior art techniques that provide a high level of security in a wired network are inadequate for wireless world.

Such prior art techniques include those discussed in the following references: C. E. Shannon, "Communication Theory of Secrecy Systems," *Bell System Technical Journal*, vol. 28, pp. 656-715, October 1949; H. Yang, F. Ricciato, S. Lu, and L. Zhang, "Securing a wireless world," *Proceedings of the IEEE*, vol. 94, no. 2, pp. 442-454, February 2006; K. Bicakci and B. Tavli, "Denial-of-service attacks and countermeasures in IEEE 802.11 wireless networks," *Computer Standards & Interfaces*, vol. 31, no. 5, pp. 931-941, September 2009; B. Vaidya and H. Lim, "Secure framework for multipath multimedia streaming over wireless ad hoc network," *IEEE WCNC* 2009, pp. 1-6, April 2009; G. Thamilarasu, "*Cross-Layer Design for Security in Wireless Ad Hoc Networks*," Ph. D Dissertation, State University of New York, July 2009; Y Sheng, K Tan, G Chen, D Kotz and A Campbell, "Detecting 802.11 MAC layer spoofing using received signal strength," *IEEE INFOCOM* 2008, April 2008, pp. 1768-1776; M. Bogdanoski, P. Latkoski, A. Risteski and B. Popovski, "IEEE 802.16 security issues: a survey," $16^{th}$ *Telecommunications forum TELFOR*, pp. 199-202, November 2008; and X. Wang, "Adaptive Orthogonal Frequency Division Multiplexing System", U.S. patent Ser. No. 12/437,358, May 2009.

SUMMARY OF INVENTION

The present invention is an adaptive secure wireless communications system and method. Generally, the present invention may be operable to address challenges and threats to a secure communication session. The secure wireless communication system of the present invention may operate one or more of the following: multiple physical-layer attributes monitoring; multiple parameter confidence testing related to transceiver (Tx-Rx) specific environment and transmitter receiver hardware characteristics; continuous and interleaved authentication; and security enhancement using dynamic adaptation of the transmission system parameters based concurrent and/or conjugated transmission of data-carrying signal and security control information. The real-time physical-layer related monitoring and interaction between transmitter and receiver, using Tx-Rx related physical environment, of the present invention may effectively reduce many wireless security threats including interception and spoofing.

In one aspect, the present disclosure relates to an adaptive secure wireless communications system comprising:
(a) at least two transceivers operable to receive at least one signal and to transmit at least one signal;
(b) a physical-layer attributes monitoring module, operable to identify one or more physical-layer parameters of the at least one signal;
(c) one or more parameter confidence testing modules, operable to perform one or more tests involving the one or more physical-layer parameters;
(d) an authentication module to authenticate the at least one signal based on results of the one or more tests;
(e) an adaptation module, operable to adapt one or more of the at least two transceivers in accordance with the authentication of the at least one signal and one or more characteristics of the one or more of the at least two transceivers to enhance the security of the adaptive secure wireless communications system; and
(f) a security signaling generator module for integrating system adaptation information and security control information with a data-carrying signal and for exchanging said information between said transceivers;
  wherein security threats to said at least one signal are reduced and wherein said authentication module authenticates the at least one signal in manner selected from:
    an interleaved manner;
    a continuous manner;
    a continuous and interleaved manner.

In another aspect, the present invention provides a transceiver for use in communicating with a remote transceiver, the transceiver comprising:

(a) a physical-layer attributes monitoring module, operable to identify one or more physical-layer parameters of at least one signal exchanged between said transceiver and said remote transceiver;

(b) one or more parameter confidence testing modules, operable to perform one or more tests involving the one or more physical-layer parameters;

(c) an authentication module to authenticate the at least one signal based on results of the one or more tests;

(d) an adaptation module, operable to adapt said transceiver in accordance with an authentication of the at least one signal and operable to adapt one or more characteristics of the transceiver to enhance a security of a communications channel between said transceiver and said remote transceiver; and (e) a security signaling generator module for integrating system adaptation information and security control information with a data-carrying signal and for exchanging said information between said transceiver and another transceiver;

wherein said authentication module authenticates the at least one signal in manner selected from:
an interleaved manner;
a continuous manner;
a continuous and interleaved manner.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The embodiments of the present invention will now be described by reference to the following figures, in which identical reference numerals in different figures indicate identical elements and in which.

Figure 1:
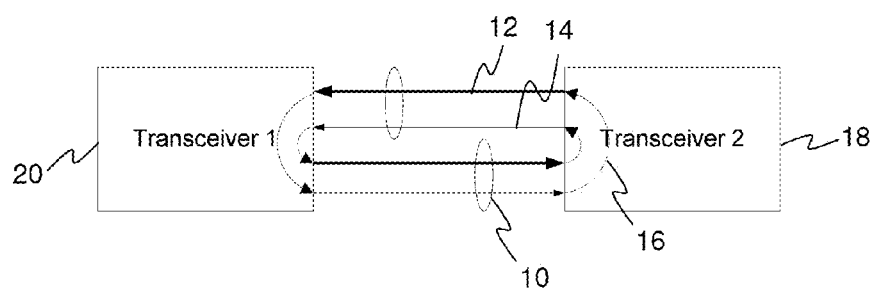
FIG. 1 shows an embodiment of the present invention that incorporates security enhancement though continuous and interleaved authentication and link adaptation.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE INVENTION

The present invention is an adaptive secure wireless communications system and method. Generally, the present invention may be operable to address challenges and threats to a secure communication session. The secure wireless communication system of the present invention may operate one or more of the following: multiple physical-layer attributes monitoring; multiple parameter confidence testing related to transceiver (Tx-Rx) specific environment and transmitter receiver hardware characteristics; continuous and interleaved authentication; and security enhancement using dynamic adaptation of the transmission system parameters based concurrent and/or conjugated transmission of data-carrying signal and security control information. The real-time physical-layer related monitoring and interaction between transmitter and receiver, using Tx-Rx related physical environment, of the present invention may effectively reduce many wireless security threats including interception and spoofing.

The present invention may involve time-varying transmission. The present invention may be operable to apply one or more of the following: multiple physical-layer attributes monitoring; multiple physical-layer attributes testing; continuous/interleaved physical-layer authentication; and security enhancement. In particular, continuous authentication may be achieved by the present invention through a transmission parameter adaptation. Such an adaptation may be enabled and/or operated by an additional signaling link between a transmitter and received based on precoded cyclic prefix (PCP). Time-varying physical-layer transmission parameters of the OFDM system may be effectively transmitted to for the legitimate users through use of the present invention.

The present invention may utilize frequency offset of different physical-layer attributes, for example, such as channel impulse response, delay spread, sparsity, Doppler shift, signal strength and noise figures of the received signal, and parameters related to the transmitter hardware characteristics in a physical-layer authentication scheme. Time-varying models for the parameters of the present invention may also be used in the authentication scheme in a fast-varying communication environment.

The present invention may apply authentication and additional security enhancement techniques based on a physical-layer to address the vulnerability introduced by the wireless signal propagation environment. The physical properties of the wireless medium can be a powerful and under-utilized source of domain-specific information. Such domain-specific information may be utilized to complement and enhance traditional security mechanisms. The wireless physical-layer may be utilized to augment communications security due to the emergence of ad hoc and other less centralized wireless networks.

In one of the embodiment of the system of the present invention, an Orthogonal Frequency Division Multiplexing (OFDM) system with precoded cyclic prefix (PCP), which continuously changes over different OFDM blocks, may be utilized to convey the time-varying physical-layer transmission parameters of the OFDM system for the legitimate users. The system parameters may be one or more of the following: a number of the subcarriers; a modulation scheme; a power level; a cyclic shift of the OFDM signal, or other parameters. The PCP enabled signaling link may be utilized to operate transceiver interaction to achieve communication efficiency improvement or security enhancement.

In another embodiment of the present invention, the PCP sequences may be designed with the same time and frequency domain characteristics as normal OFDM signal to avoid possible interception by an adversary. With the proper recovery of system parameters, legal users may demodulate the received signals after the PCP demodulation.

The present invention may offer particular benefits or advantages of the prior art. Known prior art methods developed for wireless environments may fail to effectively secure a wireless communication. The present invention may operate one or more of the following to effectively secure a wireless communication: monitoring of multiple physical-layer attributes; analysis of multiple physical-layer attributes; continuous authentication; interleaved authentication; and system adaptation. The present invention may apply a PCP-OFDM whereby secure wireless communications are made possible. The present invention may operate to cause a communication signal, for example, such as a signaling and data-carrying signal, to become completely a noise-like signal for illegal users. In this manner the present invention may provide secure wireless communications which prior art systems are unable to provide.

Another benefit of the present invention over the prior art may be the ability of the present invention to apply physical-layer attributes in order to improve the confidence level of an authentication test. Prior art authentication and cryptographic techniques utilize only higher layers of the network protocol stack. The present invention may utilize different physical-layer attributes related to the propagation environment or the hardware involved in the communication process in the authentication process. For this reason the present invention may significantly improve the confidence level of the authentication test over such tests of the prior art.

Another benefit of the present invention over the prior art may be parameters applied by the present invention to achieve channel authentication. The prior art may apply limited means, if any, to undertake channel authentication. The present invention may apply one or more of the following to achieve channel authentication: channel variation; speed of channel variation; channel correlation; signal arrival angle; Doppler frequency; delay spread; sparsity; and/or deviation from the predicted channel response. The result may be that the present invention may achieve an improved channel authentication compared to that of the prior art. Improved channel authentication may further ensure that legitimate users are linked in a wireless communication session, which means that the communication session will be more secure.

Another benefit of the present invention over the prior art is that the present invention may ascertain the position of the transmitter and may utilize this for authentication purposes. The prior art does not ascertain, or utilize the position of the transmitter for authentication purposes. The present invention may therefore provide an authentication process that is more reliable, effective and accurate than the authentication process of prior art systems.

Another benefit of the present invention over the prior art may be that the present invention may ascertain the hardware characteristics of the transmitter. The hardware characteristics of the transmitter ascertained by the present invention may include, for example, carrier frequency offset. The present invention may further utilize and involve the hardware characteristics of the transmitter in its system and method, to improve its ability to authenticate legitimate users and to secure a communication session. Prior art examples do not actively recognize hardware characteristics of a transmitter, or apply such hardware characteristics as a consideration in prior art systems and methods.

Another benefit of the present invention over the prior art may be that the present invention incorporates an integrated authentication technique that monitors physical-layer attributes. The relative variations of physical-layer attributes may be ascertained by the present invention through the monitoring. Prior art systems and methods do not recognize variations in the physical-layer attributes. The present invention may utilize such information to improve the effectiveness of the security of a wireless communications system.

Another benefit of the present invention over the prior art may be that the present invention operates a continuous verification process and a continuous adaptation process. Prior art systems and methods may not apply continuous verification and adaptation processes. The present invention may utilize a concurrent signal link to operate the continuous verification and adaptation processes. This aspect of the present invention may cause interception of the wireless signal to be extremely difficult for illegal users. System parameters will be unknown to illegal users. The present invention may therefore provide enhanced communication security over that offered by the prior art.

Another benefit of the present invention over the prior art may be that the present invention may operate PCP signaling specifically designed for a particular OFDM. The prior art may not operate signaling specifically designed for a particular OFDM. The advantage of the present invention operating PCP signaling specifically designed for a particular OFDM may be that the signaling and data-carrying signal may have identical characteristics in both frequency and time domain.

The present invention may therefore provide an enhanced communication session, that is also secure, which the prior art is unable to provide.

Another benefit of the present invention over the prior art may be that the present invention may be operated together with adaptive communication techniques. Prior art systems and method may be unable to work with adaptive communication techniques. The present invention may be operable to simultaneously improve both security and quality of the wireless transmission during a communication session.

Another benefit of the present invention over the prior art may be that the present invention may operate a continuous/interleaved authentication/adaptation based on the results of physical-layer attributes and the corresponding variations. Prior art systems and methods may not provide these features. The present invention may therefore utilize results derived from analysis or monitoring of physical-layer attributes, and any corresponding variations recognized in these results, to continuous authenticate the communication session. These results may also be utilized to continuously adapt the communication session and related security to ensure the session is secure. Additionally, the authentication and adaptation processes of the present invention may be operated in an interleaved manner. The culmination of these elements and aspects of the present invention is an improved secure wireless communication session over what is achievable by the prior art.

Another benefit of the present invention over the prior art may be that the present invention may utilize one or more transmission system parameters of an OFDM signal to adapt the present invention to provide a secure communication session. The transmission system parameters may include one or more of the following: the number of the subcarriers; bandwidth; modulation scheme; power level; cyclic shift of the OFDM signal; and other transmission system parameters. The prior art may not apply these transmission system parameters, and therefore may not achieve the result of a secure wireless communication session that the present invention operates to provide to legitimate users.

One embodiment of the present invention may operate continuous and interleaved security enhancement through transceiver monitoring and interaction. The continuous and/or interleaved transceiver monitoring, interaction and authentication may prevent signal interception and spoofing. These processes of the present invention may be fully based on one or more of the following: the physical signal propagation environment; the real-time transmitter and receiver interaction; or some predetermined security key.

As shown in FIG. 1, transmission may occur in two directions between two transceivers 20 and 18. The transmission may involve transmission of communication data 12 and TX-Rx interaction signaling 14 between the transceivers 20 and 18. For example, the transceiver sending communication data may be operating as a transmitter, whereas the transceiver receiving communication data may be operated as a receiver. Each of the transceivers may operate as both a transmitter and a transceiver.

Each transceiver (i.e. transmitter-receiver) may be capable to operate authentication and/or adaptation related processes 16. The authentication and/or adaptation related processes may utilize either communication data or TX-Rx interaction signaling transmitted between the transceivers as input. The processes may further output either communication data or Tx-Rx interaction signaling. Concurrent transmission or conjugated transmission 10 of communication data and/or controlling information may occur between the transceivers.

Embodiments of the present invention may utilize different systems, such as duplex systems, for example a frequency division duplex (FDD) system, or a time division duplex (TDD) system. In these instances the operation of the present invention may vary. For example, should the two directions of the transmission between the two transceivers utilize FDD, the present invention may achieve continuous authentication and Tx-Rx interaction through concurrent transmission of communication data and control signaling. In an embodiment of the present invention wherein the two directions of the transmission utilize time division duplex (TDD), the system may achieve interleaved authentication and Tx-Rx interaction because the two transceivers have to share the communication time.

Figure 2A:
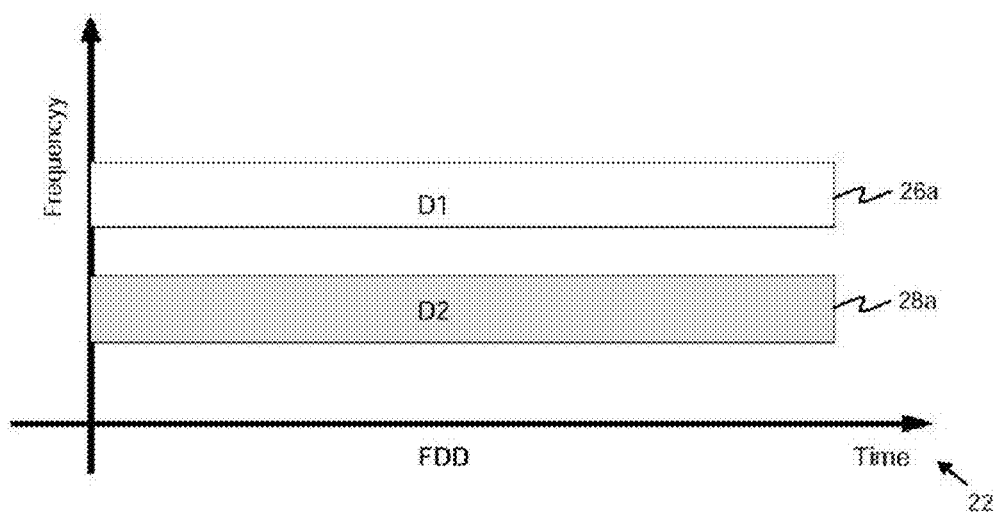
FIG. 2a shows graphical representations of continuous and interleaved authentication when the two directions of the communications are duplexed using FDD in one embodiment of the present invention.
Figure 2B:
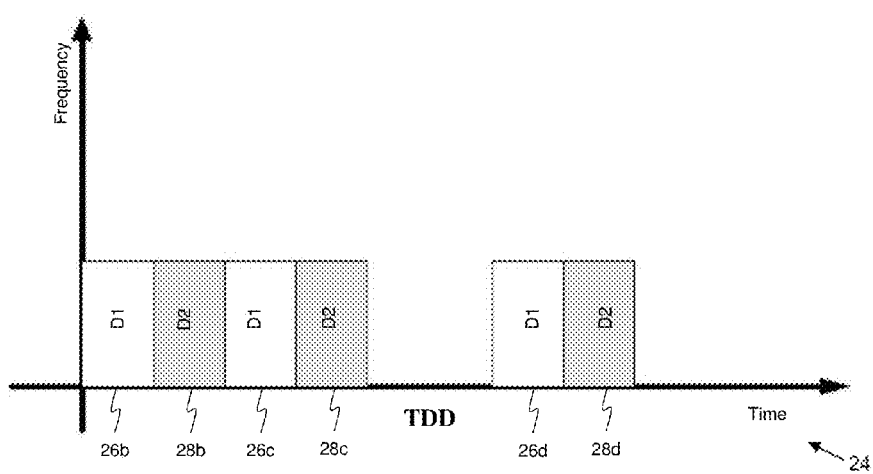
FIG. 2b shows graphical representations of continuous and interleaved authentication when the two directions of the communications are duplexed using TDD in one embodiment of the present invention.

As shown in FIG. 2a, a conjugated transmission link from a first transceiver to a second transceiver 26a in an embodiment of the present invention that utilizes an FDD system 22, may be distinct and separate from a conjugated transmission link from the second transceiver to the first transceiver. Whereas, as shown in FIG. 2b, in an embodiment of the present invention that utilizes a TDD system 24, conjugated transmission links from the first transceiver to the second transceiver 26b, 26c, and 26d may be integrated with conjugated transmission links from the second transceiver to the first transceiver 28b, 28c, and 28d. In this manner a controlling signal and a data-carrying signal transmitted concurrently between two transceivers may be integrated into one signal.

In one embodiment of the present invention, the transceiver interaction may be controlled by a predetermined security key. In another embodiment of the present invention, the transceiver interaction may be controlled by the physical environment of the particular transceiver pair involved in the communication process.

The link utilized to permit the transmission of signaling data (signaling link), for example, such as Tx-Rx interaction signaling, may share identical time and frequency characteristics with the link utilized to permit the transmission of data-carrying (data-carrying link), for example, such as a link that transmits communication data. The differentiation of communication signal and security signaling may be prevented in the present invention due to the identical time and frequency characteristics of the signaling and data-carrying links.

In one embodiment of the present invention a controlling signal operable to transmit controlling information or signaling data, and the data-carrying signal operable to transmit communication data, may be integrated into one signal before transmission. The integration of the signals may be achieved by a process of the present invention that causes no distinct difference to be introduced to the controlling signal in either its time or frequency domains, compared with the data-carrying signal. The integration may be performed so that no gap is left in either frequency or time domain between the signaling data and communication data.

The dependency between the controlling information and data-carrying signal may also be established by the signal integration process of the present invention. For example, the controlling information may incorporate and carry all of the transmission parameters of the data-carrying signal. One method for integrating the signals may be the application of a precoded cyclic prefix for orthogonal frequency division multiplexing (PCP-OFDM) system, as discussed herein.

Figure 3:
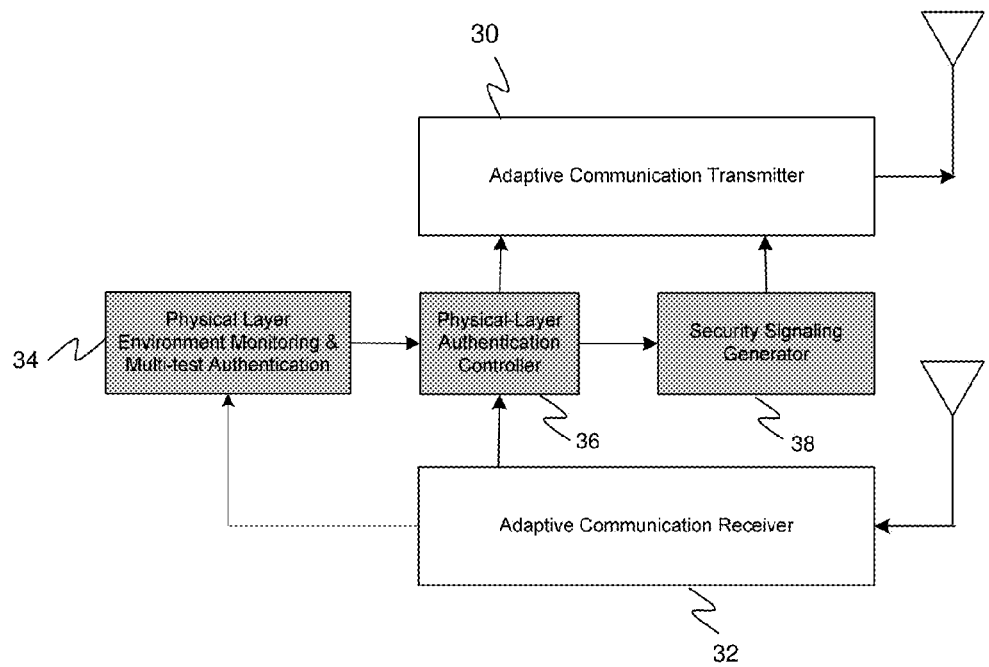
FIG. 3 shows an embodiment of the present invention security enhancement system incorporating a transceiver structure operable to perform physical-layer authentication.

In one embodiment of the present invention, as shown in FIG. 3, the structure of the wireless transceiver may support one or more of the following: physical-layer attributes monitoring; continuous and/or interleaved authentication; and dynamic system adaptation for security enhancement. A signal, which may include particular data, may be received by an adaptive communication receiver 32, for example, such as a transceiver. The adaptive communication receiver may transfer all or a portion of the signal to a physical-layer environment monitoring module 35, and/or a physical-layer authentication controller 36.

The physical-layer environment monitoring module may monitor the signal and recognize parameters therein. The physical-layer environment monitoring module may keep track of various parameters of the received signal. Such parameters may include a modulation scheme, carrier frequency, carrier frequency offset, channel impulse response, location information, variations of the parameters, or other parameters. As one example, in an embodiment of the present invention that is an OFDM based system, the structure of the wireless transceiver may further include one or more additional parameters, for example, such as, the number of the subcarriers, modulation schemes used, cyclic shift of the OFDM signal, and any duration of cyclic prefix.

The physical-layer environment monitoring module may also operate multiple authentication tests. Such tests may be utilized to verify and otherwise authenticate that a local receiver is a receiver in use by a legitimate user of a communication session. For example, a remote transmitter may be verified by a local receiver through a process of the present invention that involves analyzing the physical-layer parameters of the remote transmitter. Such layer parameters may be acquired from the local receiver after processes of physical-layer environment monitoring, and such processes may include synchronization, channel estimation and data demodulation. A skilled reader will recognize that parameters may be available at different stages of the communication signal receiving process.

The physical-layer environment monitoring module may transmit parameters and/or results of authentication tests to a physical-layer authentication controller 36. The parameters and/or results from monitoring and testing the physical-layer environment may be utilized by the physical-layer authentication controller to determine how to adapt the communication system for security enhancement. The physical-layer authentication controller may further utilize other information collected by the system, for example, such as other arrangements between the transceivers. A skilled reader will recognize that variety of information that may be collected by the present invention that may be utilized by the physical-layer authentication controller.

The determination process of the physical-layer authentication controller may have several results, for example, such as a channel impulse response, a frequency offset, any variation of these, or other results.

The physical-layer authentication controller may analyze variation of physical-layer attributes over time in its determination process. This may involve historical monitoring and the comparison of parameters collected over time. Such historical parameters may be stored in any storage means that may be integrated with, or linked to the present invention, and accessible by at least the physical-layer authentication controller. The analysis of the physical-layer attributes over time may be utilized to enhance the authentication and identification confirmation performed by the present invention. The physical-layer authentication controller may determine if any change or variation is detectable through the application of historical monitoring and/or analysis of historical parameters. The change or variation may be compared to a set range of change or variation that is identified as a normal variation. If the detected change or variation is beyond a normal variation then the present invention may deny and/or disconnect the communication process and/or communication session.

Should the physical-layer authentication controller successfully complete its authentication process, and thereby determine that the signal is from a communication session of a legitimate user, the security signaling generator 38 and adaptive communication transmitter 30 may receive an indication from the physical-layer authentication controller that the communication session is authenticated. The security signaling generator may operate to generate a security signal and the security signal may be transmitted to the adaptive communication transmitter. The adaptive communication transmitter may transmit a signal that is, or is integrated with, the security signal.

In one embodiment of the present invention a local transceiver may also decide to enhance the security through a self-initiated transceiver interaction. The interaction may involve the adaptation of one or more of the system parameters of one or more of the physical-layer transmission systems modules, for example, such as the physical-layer environment monitoring module and/or the physical-layer authentication controller. For example, the decisions that result from this interaction may involve the authentication results of the physical-layer authentication controller, as described herein. The results of the physical-layer authentication controller may be directed to the security signaling generator. The security signaling generator may control the adaptation of the physical-layer transmission parameters of the wireless system.

Monitoring of a Communication Environment

The present invention may operate monitoring of a wireless communication session environment. The present invention may further recognize certain characteristics of the hardware of the one or more transmitters utilized in the invention and utilize this information for a physical-layer authentication process.

The present invention may identify multiple physical-layer attributes relating to an ongoing wireless communication session process. The communication session may be monitored and the attributes may be identified as part of the monitoring process. The attributes that may be identified may include one or more of the following: channel impulse response for the channel between the transmitter and receiver; variation of the channel impulse response; central frequency; carrier frequency offset; modulation scheme; location information and angle of arrival for the signal and each multipath components; and other parameters.

Figure 4:
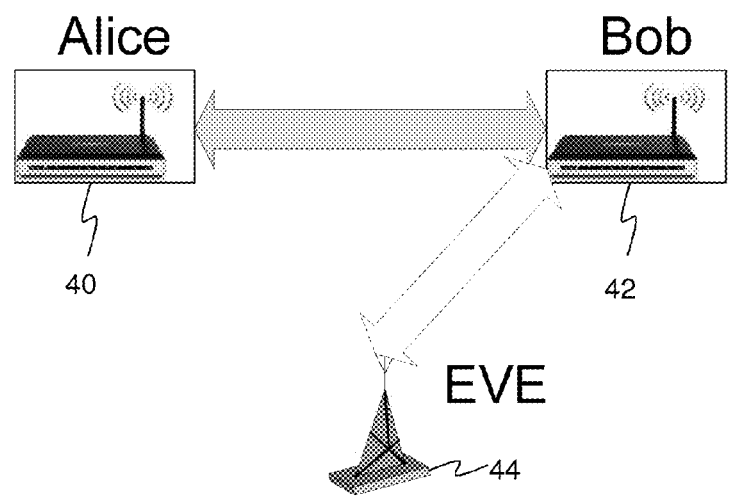
FIG. 4 shows an embodiment of the system of the present invention incorporating physical-layer authentication and security enhancement scheme through system adaptation.

An example of the physical environment monitoring based authentication scheme of an embodiment of the present invention is shown in FIG. 4. Two or more legitimate users may engage in a communication session, for example, such as Alice 40 and Bob 42. One or more illegitimate users may attempt to access the communication session, for example, such as Eve 44. The legitimate and illegitimate users may be located remotely from one another, for example such as in spatially different and distanced positions. Alice, may be a legitimate transmitter, and she may deliver data to an intended receiver who may be Bob. Eve may represent an adversary who is attempting to disturb the transmission between Alice and Bob.

The present invention may provide Bob with the capability to verify whether particular signals are sent by Alice. Specifically, the present invention may operate at least one authentication process to determine the identity of a transmitter of a signal. The at least one authentication process may compare current physical-layer attributes monitoring results with historical monitoring statistics between Alice and Bob as an authentication testing means. To improve the confidence level of the authentication test, different physical-layer attributes may be combined to generate the overall authentication decision.

Bob may also initiate a continuous and/or interleaved authentication process through adaptation of the communication link with Alice. The particulars of the adaptation of the communication link with Alice undertaken by Bob may depend on the real-time parameters of the physical communication environment existing between Alice and Bob.

The process for monitoring of the communication environment between two users may include radio propagation environment, which is reflected by the channel impulse response and its delay spread. The monitoring process may also include sparsity, Doppler shift, location of the transmitters, angle of arrival for the signal of interest, and parameters related to the hardware components of the transmitter and receiver involved in the communication process. For example, parameters related to the hardware components of the transmitter and receiver involved in the communication process may include carrier frequency offset between the transmitter and receiver, as well as spectrum mask of the transmitted signal.

Figure 5:
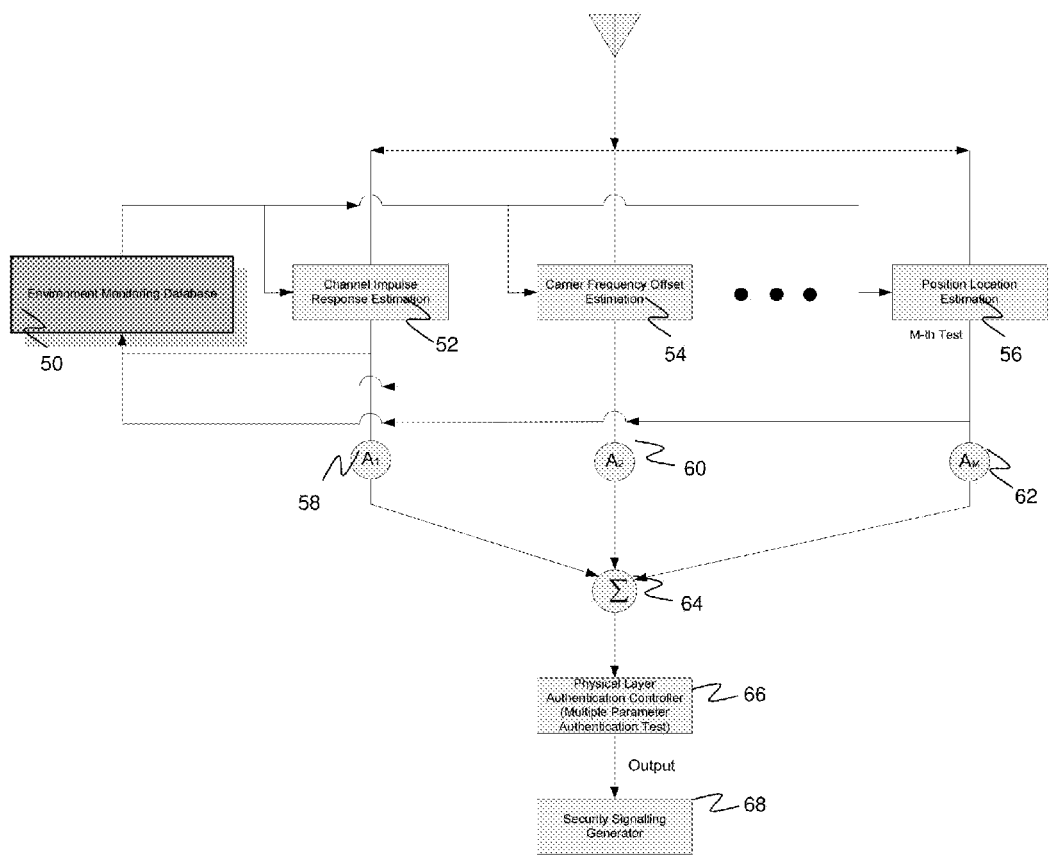
FIG. 5 shows an embodiment of the system of the present invention for physical-layer authentication based multiple physical-layer attributes monitoring.

One embodiment of the present invention may include an authentication decision system, as shown in FIG. 5. The authentication decision system may be made based on the results of the multiple parameter monitoring. As an example, the multiple parameter monitoring may be undertaken by elements of the present invention, and the results of the monitoring may be stored in a data storage area, for example, such as an environment monitoring database 50. The multiple parameter monitoring may utilize the radio signal propagation environment, and characteristics of the hardware of the transmitter and receiver, to achieve a determination as to whether a received transmission is authentic. An authentic received transmission is a transmission that is received from a legitimate user.

As shown in FIG. 5, an embodiment of the system of the present invention may include multiple monitoring elements and tests, for example such as a channel impulse response estimation 52, a carrier frequency offset estimation 54, and a position location estimation 56. Other monitoring elements and tests may also be included in embodiments of the present invention. Each monitoring element and test may provide results 58, 60 and 62. The results may be collected 64 and transmitted to a physical-layer authentication controller 66 that operates a multiple parameter authentication test. As described herein the physical-layer authentication controller may operate processes to determine whether a signal is authentic and is transmitted from a legitimate user. Output from the physical-layer authentication controller may be transmitted to the security signaling generator 68.

The present invention may construct a confidence indicator for the proposed multiple physical-layer attributes tests using:

$$C = \sum_{m=1}^{M} A_m T_m \tag{1}$$

where $A_m$ is the weight factor for the m-th test, and $T_m$ is the monitoring results from the m-th test, which indicate the normalized changes of the parameter under monitoring. For example, the normalized changes of the parameter under monitoring may be one or more of the following: the relative change of the channel impulse responses at two different channel estimation times; variation speed of the channel; angle of arrival of the received signal; carrier frequency offset and its deviation from the historical values from the monitoring database; or other normalized changes.

The present invention may undertake multiple physical-layer attribute tests based on the parameters derived from monitoring the physical-layer environment. The one or more tests may be prioritized in the present invention, to indicate weight of the results of each tests to indicate that a signal is authenticated or not. For example, some tests may offer a greater indication of the authentication of a signal as being transmitted by a legitimate user, whereas other tests may offer a lesser indication of the authentication of a signal as being transmitted by a legitimate user. A test that offers a greater indication may be prioritized higher than a test that offers a lower indication. A higher prioritized test should therefore be able to provide a more significant positive authentication of a signal than a lower prioritized test. Tests may be considered together to achieve an authentication, or individual tests with high priorities may be considered to verify authentication in isolation. A confidence level may be applied to either the combination of tests, or individual tests, to indicate the likelihood that the authentication result is correct and accurate.

The weight factor $A_m$ may be determined either empirically or by the priority of the each related physical-layer attributes test. Offline tests may also be utilized by the present invention to determine the weight factors of particular physical-layer attributes and the priority of such tests in relation to other tests.

In the physical-layer attribute monitoring and authentication processes of the present invention, the authentication result may be achieved by comparing the overall confidence level of the received signal attribute to a threshold that represents the desired security level that the communication session, or devices utilized in the communication session, would like to achieve. Should the authentication fail the confidence tests one or more other measures may be initiated as a precautionary measure to avoid potential security risks. Such precautionary measures may include one or more of the following: initial handshaking including provision by the parties of one or more additional recognized passwords; security key; encryption measures; and other precautionary measures.

Monitoring of the Physical-Layer Communication Environment

A skilled reader will recognize that a number of physical-layer attributes may potentially be used for authentication purposes. The following are examples of some of these physical-layer attributes that may potentially be used for authentication purposes. A skilled reader will recognize that these are merely examples and that other physical-layer attributes may also be used for authentication purposes.

Channel Impulse Response Monitoring and Related Authentication

In one embodiment of the present invention, the channel impulse response (CIR) of a communication channel may be obtained by traditional channel estimation at receiver side of a communication system.

Without loss of generality, the channel model utilized may be a multipath slow varying channel, although a skilled reader will recognize that other channel models may also be utilized in the present invention. The received signal y corresponding to the transmitted signal x in the presence of Gaussian noise w may be expressed as $$y(n) = \sum_{l=0}^{L-1} h_l x(n-l) + w(n). \quad (2)$$

The received signal now is $$y = xh + w. \quad (3)$$

where $$x = \begin{bmatrix} x(0) & x(N-1) & \ldots & x(N-L+1) \\ x(1) & x(0) & \ldots & x(N-L+2) \\ \vdots & \vdots & & \vdots \\ x(N-1) & x(N-2) & \ldots & x(N-L) \end{bmatrix}. \quad (4)$$

The channel estimate is given by $$\hat{h} = (x^H x)^{-1} x^H y. \quad (5)$$

The channel estimation results in time domain may be denoted by $$\tilde{h}(t) = \sum_{l=0}^{L-1} a_l(t) \delta(t - \tau_l) \quad (6)$$

where $a_l(t)$ and $\tau_l$ are the amplitude and the propagation delay of the $l^{th}$ multipath component. In Rayleigh fading channel, $a_l(t)$ may be modeled as a complex Gaussian random variable with zero mean and variance $\sigma_l^2$.

A skilled reader will recognize that various physical-layer authentication schemes may be achieved based on the normalized changes of the different properties of the channel impulse response. For example, the changes in the channel impulse response estimated at two different times may be defined as $$T_h = |\hat{h}_1 - \hat{h}_2|^2 \quad (7)$$

A security alert may be triggered if the above change in the channel impulse response is greater than some predefined threshold.

In addition, other attributes of the channel impulse response may also be monitored as well. These may include:

$$T_{\Delta h} = |\Delta h_2 - \Delta h_1|^2 \quad (8)$$
$$= |(\hat{h}_2 - \hat{h}_1) - (\hat{h}_1 - \hat{h}_0)|^2$$

$$T_{\Delta t} = \sum_{l=0}^{L-1} |t_{l,1} - t_{l,2}|^2 \quad (9)$$

and $$T_{R_{hh}} = |R_{\hat{h}_2 \hat{h}_1} - R_{\hat{h}_1 \hat{h}_0}|^2 \quad (10)$$

where $t_{l,i}$, and L in equation (9) are the arrival time of the l-th path of the i-th estimation and the channel duration respectively, and $R_{hh}$ in equation (10) represents the correlation of two channel impulse responses.

In one embodiment of the present invention, the authentication using the channel impulse responses may be made based on the difference between the predicated channel impulse response using the historical channel estimation results, and the true observed channel estimation result, i.e., $$T_h = |\hat{h}_l - \hat{h}_{l,p}|^2 \quad (11)$$

where $\hat{h}_{l,p}$ the predicted l-th channel impulse responses predicated using historical channel estimates i.e, $\hat{h}_{l-1}$, $\hat{h}_{l-2}, \ldots, \ldots$.

Figure 6:
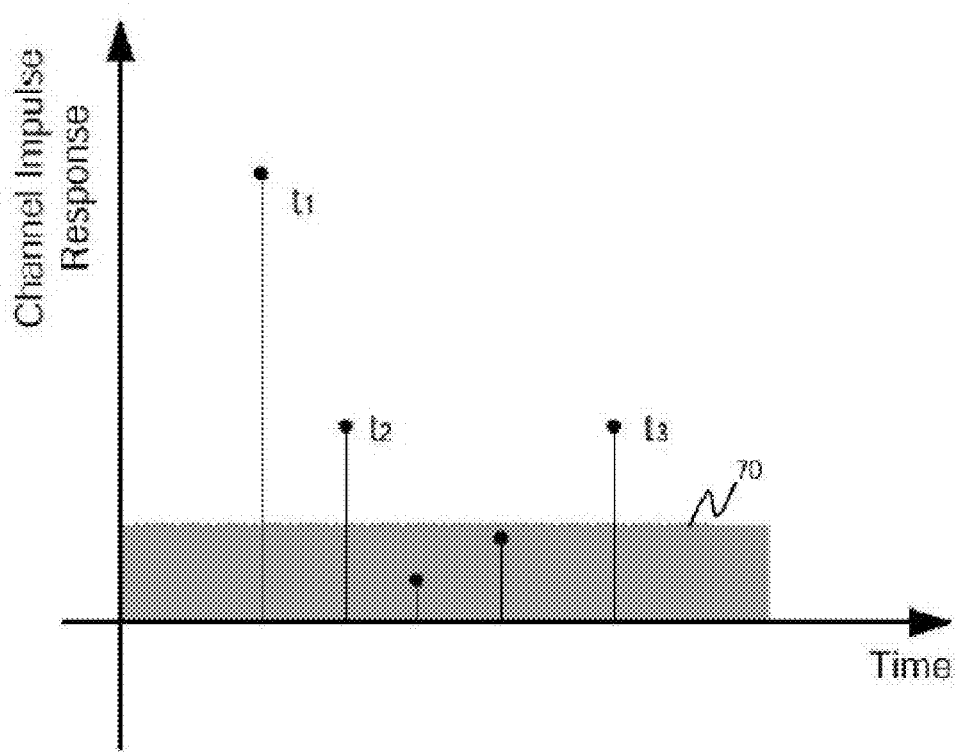
FIG. 6 shows a graphical representation of the performance of an embodiment of the present invention incorporating physical-layer authentication using channel impulse response.

The estimated channel impulse responses obtained using equation (6) may normally be noisy, particularly from the wireless communication environment. To enhance the CIR variation detection, some of the estimated channel tap coefficients overwhelmed by background noise may be set to zero before the authentication tests in equations (7)-(11), as shown in FIG. 6.

With the estimated noise level in the received communication signal, a noise threshold 70, which is proportional to the standard deviation of the background noise $\sigma_w$, may be used for elimination of the noisy channel tap coefficients. As a result, the difference of the channel impulse responses is calculated only on the selective taps which are significant against the background noise.

Decision-Directed Noise Level Estimation.

There are many existing methods for noise level estimation in the received communication signal. In several existing models decision directed methods are utilized to perform estimations of the noise variance. For instance in an OFDM system, the variance of the decision directed error between the equalized demodulator output and the related decisions is a good estimation of the noise.

In the present invention, the received signal in the frequency domain may be expressed as:

$$Y = HX + W \quad (12)$$

The equalized signal becomes:

$$\tilde{X} = Y/H = X + W/H, \quad (13)$$

where $\tilde{X}$ is the equalized signal.

So the variance of the noise may be estimated as $\sigma_W^2 = \text{var}(\tilde{X} - X')$, where X' is the decision.

Once the variance of the noise is estimated, the threshold used to mitigate the noise impact may be determined as follows, $$\eta_w = C \sigma_w \quad (14)$$

where C is a constant from the system design.

Therefore the improved channel impulse response variation with noise mitigation may be determined as:

$$\Delta h = \sum_{l \in D} |h_{l,1} - h_{l,2}|^2 \quad (15)$$

where D is set of channel impulse response indexes which are significant than the $\eta_w$.

Similarly, the variation of the arrival time of all multipath functions may be $$T_{\Delta t} = \sum_{l \in D} |t_{l,1} - t_{l,2}|^2 \quad (16)$$

Carrier Frequency Offset Estimation, Monitoring and Authentication

Carrier frequency offset can be caused by carrier frequency difference between the transmitter and receiver. Frequency offset may be especially problematic in OFDM systems as compared to single carrier systems.

In the present invention, the frequency offset may be divided into an integer part and a fractional part, i.e.

$$\Delta f_c T = A + \Delta k \quad (17)$$

where A is an integer and $\Delta k \epsilon(-\frac{1}{2}, \frac{1}{2})$. The integer part A may be found by way of a simple frequency domain correlation between the demodulated OFDM symbol and the in-band pilot. The fractional part may be estimated by correlating the signal samples at distance T apart (OFDM) using the cyclic prefix. The signal samples of the cyclic prefix and its counterpart at a distance T (FFT symbol length) apart are identical except for a phase factor due to frequency offset.

$$\Delta \hat{k} = \frac{1}{2\pi} \arg\left\{\sum_{n=0}^{L-1} r(n) r^*(n+N)\right\}. \tag{18}$$

where $r(n)$ and $r(n+N)$ are signal samples from a preamble with two identical halves. Once the different carrier frequency offsets are estimated at different times, the related authentication can be achieved using.

$$T_{\Delta k} = |\Delta \hat{k}_2 - \Delta \hat{k}_2|^2 \tag{19}$$

Positioning of Transmitter of Interest and Related Monitoring and Authentication In the present invention, the location of an active transmitter engaged in a communication process may be identified through a collaborative way among all the authenticated users, for example, Tx A, B, C can collaborate and identify the location of the suspicious transmitter Yves for further authentication purpose.

Figure 7:
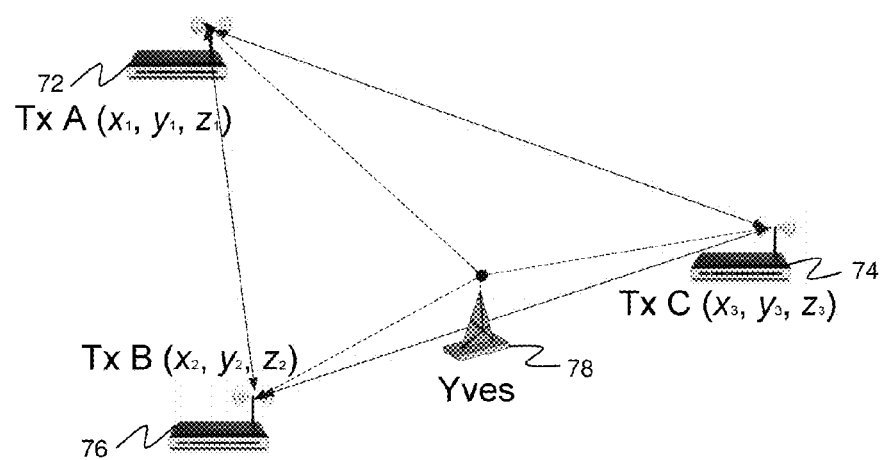
FIG. 7 shows an embodiment of the present invention incorporating position location for the transmitter of interest using collaborative processing among the authenticated transceivers.

As an example, consider three cooperative transceivers and the suspicious transmitter, as shown in FIG. 7. Three authenticated users 72, 76 and 74, each being identified as a legitimate user, are needed here to solve a three dimensional coordinate of a suspicious transmitter Yves 78. The coordinates of the three locationing transmitters, $(x_1, y_1, z_1)$ 72, $(x_2, y_2, z_2)$ 76, and $(x_3, y_3, z_3)$ 74 respectively. Denoting the propagation time from Bob to the i-th receiver as $t_i$, the simplified positioning algorithms without errors may be formulated as $$\begin{cases} t_1 c = \sqrt{(x-x_1)^2 + (y-y_1)^2 + (z-z_1)^2} \\ t_2 c = \sqrt{(x-x_2)^2 + (y-y_2)^2 + (z-z_2)^2} \\ t_3 c = \sqrt{(x-x_3)^2 + (y-y_3)^2 + (z-z_3)^2} \end{cases} \tag{20}$$

where c is the constant for light propagation velocity. The total number of the slave nodes may be reduced to two if a two dimensional coordinate is used. At least four transmitters may be needed to find the coordinates of the positioning receiver when the absolute propagation time for each transmitter is not available.

Once the two position coordinates are estimated at two different times t2 and t1, the related authentication and monitoring may be achieved through $$T_{xyz} = |x_{t2} - x_{t1}|^2 + |y_{t2} - y_{t1}|^2 + |z_{t2} - z_{t1}|^2 \tag{21}$$

Figure 8:
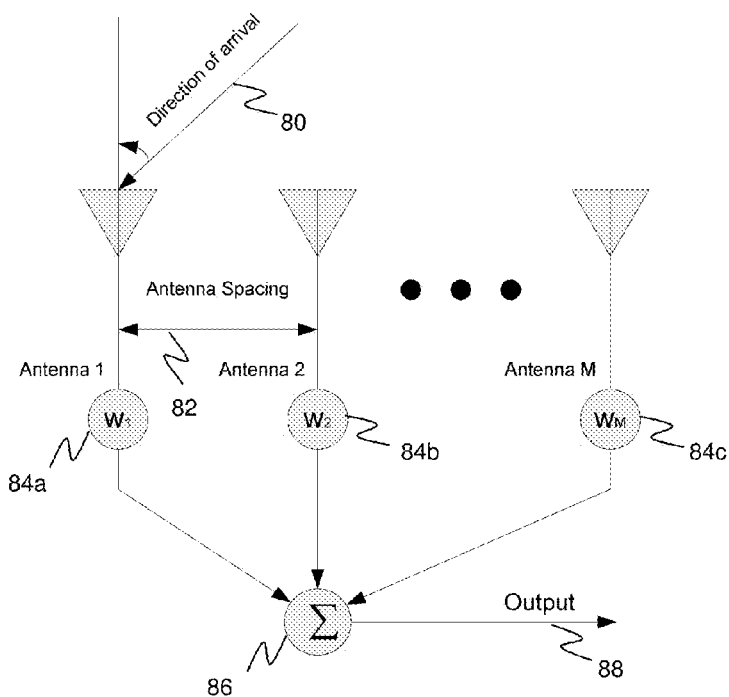
FIG. 8 shows an embodiment of the present invention incorporating detection of the angle of the arrival for the signal of interest using an antenna array.

Angle of Arrival Estimation:

In one embodiment of the present invention, a particularly effective method to estimate an Angle of Arrival (AOA) may be to utilize an antenna array, as shown in FIG. 8. Each antenna may apply a particular weight for a given arrival angle. As a result, all the antennas may introduce a spatial filtering to the arrival signal. The angle that leads to the maximum output may be determined as the arrival of the signal. Note that in wireless communication scenario, there may be several arrival angles detected at various strength due to the presence of multipath components.

The present invention may identify the direction of arrival 80 to an antenna. The system may include multiple antenna that may have spacing 82 between each antenna. Signals may be received 84a, 84b and 84c by each of multiple antennas included in a system. The signals may be collected 86 and an output signal 88 may be generated from the antenna array.

The output signal from the antenna array for a particular angle $\phi$ can be expressed as follows $$y_\phi = w_\phi^H x \tag{22}$$

where $y_\phi$ is the output of the antenna array, $w_\phi^H$ is the gain factor for angle $\phi$, and x is the arriving signal. The arrival of the signal can be determined when $y_\phi$ reaches its maximum when different angles are tried.

Once the two arrival angles are estimated at two different times t2 and t1, the related authentication and monitoring can be achieved through $$T_\phi = |\phi_{t2} - \phi_{t1}|^2 \tag{23}$$

Physical-Layer Authentication Using the Physical-Layer Attributes Monitoring

In one embodiment of the present invention, the overall physical-layer authentication decision may be made based on the results of the multiple attributes monitoring. Such results may be determined by the radio signal propagation environment as well as the hard characteristics of the transmitter and receiver. A combined confidence indicator for the proposed multiple tests can be constructed using:

$$C = \sum_{m=1}^{M} A_m T_m \tag{24}$$

where $A_m$ is the weight factor for the m-th test as indicated in equation (7)-(11), (19) (21), (23), and $T_m$ is the observed relative changes from the m-th test, which indicating the normalized changes of the parameter under monitoring. The overall authentication decision will be made according to $H_0$ (successful authentication) if $C \leq \eta_C$, $H_1$ (authentication failed) if $C > \eta_C$ (25)

where $\eta_C$ is the authentication threshold established based on the historical variations of the physical-layer attributes, which can be either obtained analytically, and experimentally.

Continuous/Interleaved Authentication in Adaptive Communications

The present invention may be a secure wireless system that functions as an adaptive communications system operable to perform conjugated transmission of the controlling signaling as well as the data-carrying signal. The overall security of the wireless system may be improved by the utilization of continuous or interleaved authentication through adaptive transmission, as may be initiated by one transceiver. Failing to follow up regarding the adaptation of the physical-layer may lead to the denial of the continued communication process. As a result, wireless receivers utilized by, or integrated or in communication with, the present invention may be authenticated by a continuous authentication process and/or an interleaved authentication process of the present invention.

An authentication process may be combined with an interleaved process, based on physical-layer attributes monitoring. Depending on the different confidence level of the physical-layer attributes monitoring, the requirement for continuous and/or interleaved authentication may be either relaxed or enhanced to achieve a level of overall system security performance.

In one embodiment of the present invention, the method of continuous and/or interleaved authentication may utilize a Precoded Cyclic Prefix (PCP) that carries an additional controlling and interaction signaling link at the physical-layer. Authentication enhancement may be introduced to block based transmissions systems through this method, for example, such as OFDM systems. The PCP sequence may replace the traditional cyclic prefix for each OFDM symbol, where the sequence can be different from OFDM symbol to another OFDM symbol.

The PCP sequences may be used to reflect current system parameters of the OFDM symbol as well as the identity of different transceivers. By using the physical-layer PCP link, a transmitter may adapt the system parameters continuously and the adaptation change may be shared only between the transmitter and receiver of legitimate users in a communication session. Meanwhile, the transmission parameters of the OFDM signal may either utilize some secret protocol known by both the transmitter and receiver, or generated according to some physical-layer attributes which are known to both transmitter and receiver.

In one embodiment of the present invention, the transmission parameters of the proposed system may be concealed from, and inaccessible by, unauthorized users. As a result, the present invention may prevent malicious PCP demodulation and further processing of the wireless signals.

In embodiments of the present invention, additional transceiver cross-layer interactions enabled by the PCP link may be utilized to further enhance security of communication sessions between legitimate users and other aspects of the present invention. For example, a conventional cryptographic scheme may be combined with the present invention to further enhance the security. A skilled reader will recognize that other transceiver cross-layer interactions enabled by the PCP link may be utilized in the present invention for the purpose of enhancing the security of communication sessions between legitimate users or other aspects of the present invention.

To evaluate the security enhancement provided by the authentication mechanism of embodiments of the present invention, a traditional OFDM system may be used as a reference platform. The OFDM system may thereby provide a reference platform for comparisons with a PCP-OFDM system. For example, the stealth and robustness of the PCP-OFDM system may be analyzed. The stealth of an authentication system may be measured by the inability of the adversary to distinguish between signals that do contain authentication information and signals that do not contain authentication information. For example, in an embodiment of the present invention involving PCP-OFDM systems, the signal detection and bit error probabilities of PCP-OFDM may be compared with the signal detection and bit error probabilities of a standard Cyclic Prefix (CP) OFDM system.

Signal detection and recovery may be more difficult for an eavesdropper in PCP-OFDM than in the traditional OFDM system due to the time-varying transmission parameters enabled by the PCP. The continuous change of the PCP, which may include variation of physical-layer parameters, for example, such as modulation or the number of sub-carriers, may cause it to be extremely difficult for an adversary to do either of the following: follow-up with the transmission parameter changes; and demodulate a series of PCP-OFDM symbols. For example, such low probability of interception (LPI) and low probability of detection (LPD) techniques may be particularly critical for high-level confidential communications, for example, such as military communications.

Robustness of the authentication system of the present invention may be measured by the probability of successful authentication. The probability of successful authentication means the probability of achieving perfect channel estimation and synchronization between two or more legitimate users engaged in a communication session. An analysis may be conducted by the present invention to determine whether perfect channel estimation and synchronization between two or more legitimate users occurs in communication sessions. The tradeoff and/or balance achieved between the stealth and robustness for an authentication scheme, system or process may further be determined by the present invention. Both properties, stealth and robustness, may be high in a secure authentication system. However, when the symbol rate of the present invention is increased the stealth of the system may increase while the robustness decreases. Extending the length of the PCP in the time domain may improve the robustness of detection. The existence of an eavesdropper in a communication session, the eavesdropped is not a legitimate user in a communication session, may cause the stealth to outweigh the robustness of the communication session.

Figure 10A:
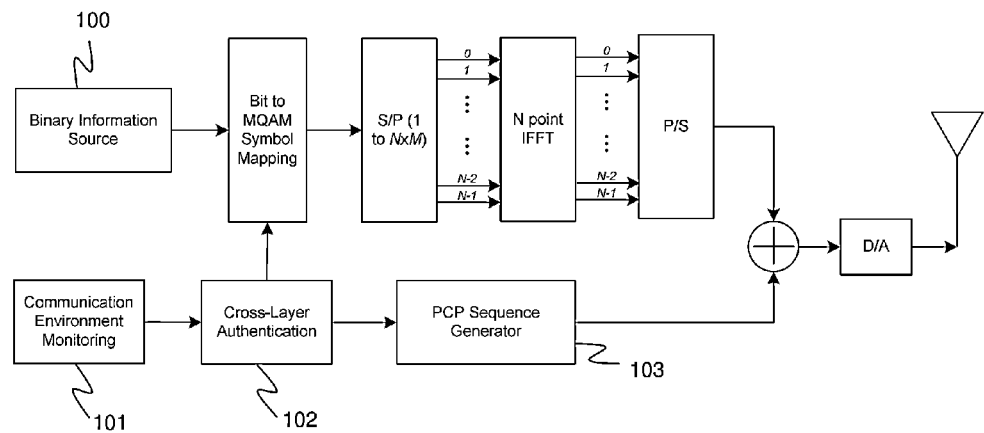
FIG. 10a shows a block diagram of a transmitter of an embodiment of the present invention incorporating continuous authentication using a PCP-OFDM system.
Figure 10B:
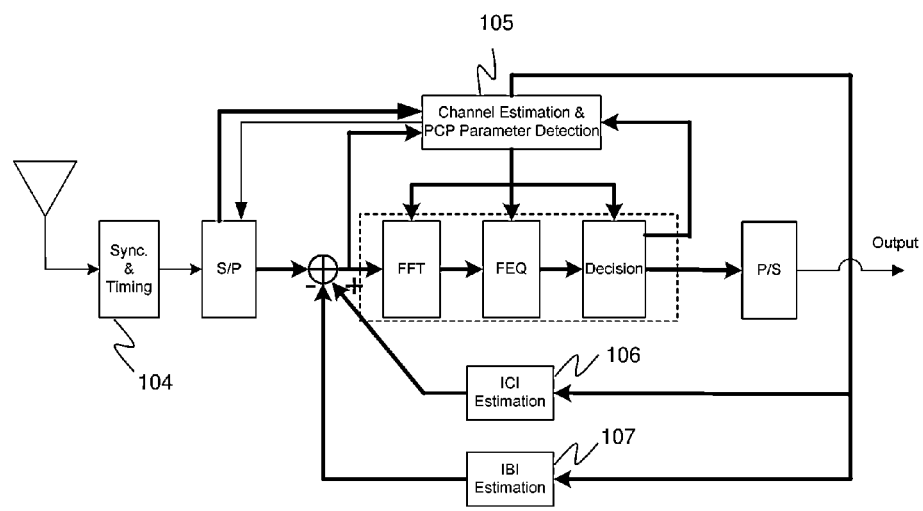
FIG. 10b shows a block diagram of a receiver of an embodiment of the present invention incorporating continuous authentication using a PCP-OFDM system.

A block diagram of the proposed continuous authentication using PCP-OFDM that may be included in an embodiment of the present invention is shown in FIGS. 10a and 10b. One major change in the transmitter in FIG. 10a from prior art transmitters, may be that the cyclic prefix is replaced by a precoded sequence for authentication purposes. The PCP sequences of the present invention may be generated from some orthogonal sequences that share similar characteristics to normal OFDM signal in both time and frequency domain.

The information used for the PCP generation may represent the time varying transmission parameters of the OFDM system for security enhancement in a communication session between two or more legitimate users. Potential transmission parameters for system adaptation and security enhancement may include, for example, the number of the subcarriers and the modulation/coding schemes used. The transmission parameter information from the cross-layer authentication unit may be used to generate different orthogonal PCP.

Precoded Cyclic Prefix Generation Using Frequency Domain Decimation

To avoid distinct time and frequency features that can be exploited by the adversaries, the PCP sequences in embodiment of the system of the present invention may be generated using an OFDM modulator.

Figure 11:
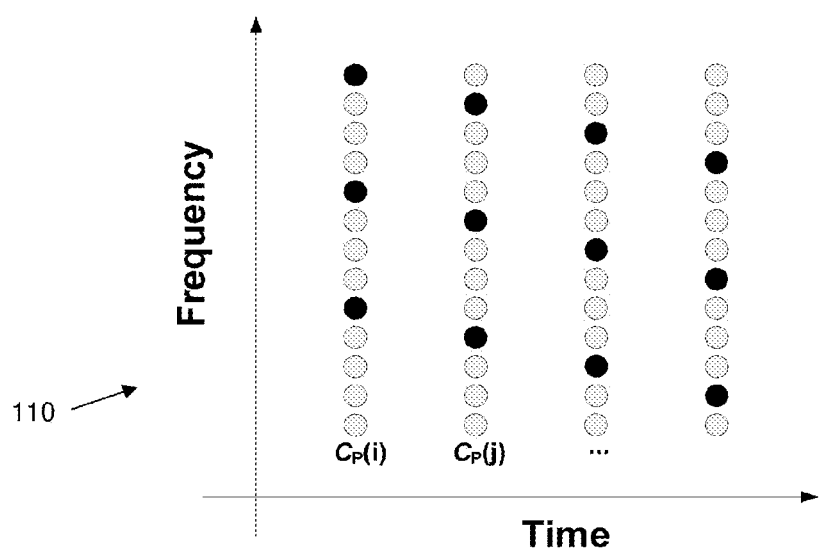
FIG. 11 shows a graphical representation of information used for PCP sequence generation by an embodiment of the present invention.

To generate a PCP sequence, an OFDM modulator of N-point may be utilized with P sparse input $C_p$ which may be distributed in the available frequency range. An example of an available frequency range 110 is shown in a table format in FIG. 11. For example, $C_p$ may be the transceiver interaction signaling for efficiency improvement or security enhancement.

The input to $C_p$ may also include some transmission system parameters of the OFDM signal, for example, such as number of the subcarriers, bandwidth, modulation scheme, power level, cyclic shift of the OFDM signal, etc. A skilled reader will recognize that a variety of transmission system parameters may be included in the input to $C_p$.

To avoid distinct time and frequency characteristics that can be exploited by the illegal receivers, the PCP sequences may be generated using an OFDM modulator. To generate a PCP sequence with length P, an OFDM modulator of N-points is used with P sparse input Cp. These inputs may be orthogonal in frequency domain and represent adaptive transmission parameters for continuous authentication. In one embodiment of the present invention, only the first P samples of the output may be used as PCP sequence. The ratio N/P may be assumed to be an integer. The time domain PCP sequence cp may be generated with $$c_p = \lambda F_N^H C_p \qquad (26)$$

where $F_N^H$ is the inverse Fourier Transform matrix for PCP generation with its (n, k)th entry $(\exp\{j2\pi n(k+l)/N\}/\sqrt{N})$. Operator $(\cdot)^H$ denotes conjugate vector/matrix transposition. The normalization factor $\lambda=\sqrt{N/P}$ is introduced in $F_N^H$ and (26) so that the PCP sequence generated by (26) can maintain the same power as the data-carrying part of the OFDM signal.

The frequency distribution of the present invention may guarantee or virtually guarantee that the PCP sequence has no distinct characteristics in frequency domain, compared with a data-carrying OFDM signal. Therefore, random frequency shift of l=random[0, N/P−1] may also be introduced to different PCPs such that no distinct frequency domain features is introduced to the PCPs. In one embodiment of the present invention, only the first P samples of the output from (26) may be used as PCP sequence.

Due to the fact that the PCP sequences are used to carry signaling information, in one embodiment of the present invention it may be important to maintain the signaling stealth. Therefore, the PCP sequences may be required to be orthogonal to each other in frequency domain. For example, two given PCP sequences $C_{p1}$ and $C_{p2}$ in frequency domain may be utilized in the present invention. By using inverse fast Fourier transform (IFFT) matrix $F_N^H = F_N^{-1}$, and conjugating vector/matrix transposition $(\cdot)^H$, $C_{p1}$ and $C_{p2}$ may be used to generate the PCP sequence in time domain using $$c_{p1} = \lambda F_N^H C_{p1}$$
$$c_{p2} = \lambda F_N^H C_{p2} \quad (27)$$

Due to the orthogonal property of the PCPs in frequency domain, it may be possible to achieve the result $$C_{P1}^H C_{p2} = 0 \quad (28)$$

The time domain PCP sequences may also be orthogonal due to the frequency domain orthogonality.

PCP-OFDM Transmitter Design

In one embodiment of the present invention, each OFDM symbol at the output may be specified by an N-point time-domain vector x obtained via an IFFT of the complex data vector x of size N, as shown in FIG. 10a. Without loss of generality, each OFDM symbol in time domain may be expressed in vector form as $$x = F_N^H X, \quad (29)$$

where $F_N^H = F_N^{-1}$ is the inverse Fourier Transform matrix with its (n, k)th entry $(\exp\{j2\pi nk/N\}/\sqrt{N})$.

Prior to any transmission of the OFDM symbol, the generated PCP sequence with length of P may be inserted as its prefix. The duration of the pseudo random length should be longer than, or at least equal to, the channel delay spread to achieve a complete removal of ISI during the demodulation process. Cyclic structure for each PCP-OFDM symbol may be produced since the pseudo random sequence will be used as cyclic prefix for all the OFDM symbols. The result may be the creation of a series of new OFDM symbols of (N+P) samples with cyclic structure similar to traditional OFDM symbols protected by cyclic prefix. As an example, without loss of generality the following signal vector for interference analysis and PCP-OFDM symbol demodulation may be utilized $$x' = [c_P(0), c_P(1), \ldots, c_P(P-1), x(0), x(1), \ldots, x(N-1)]^T \quad (30)$$

where $c_P$ is PCP-based signaling.

The system of an embodiment of the present invention to operate such as process is shown in FIG. 10a. This system may operate communication environment monitoring 101. Parameters and other information gathered by the communication environment monitoring processes may be transmitted to a cross-layer authentication module 102. The cross-layer authentication module may provide parameters and other signal information to a symbol mapping process. The processing may further involve binary source information 100 gathered by the present invention. The cross-layer authentication module may also provide parameters and other signal information to a PCP sequence generator 103.

PCP-OFDM Receiver Design

In one embodiment of the present invention, a PCP-OFDM receiver with a frequency domain equalization and time domain interference cancellation may be operated. The present invention may further operate an elaborative interference analysis.

An example of this type of embodiment of the present invention is shown in FIG. 10b. A channel estimation and PCP parameter detection module 105 is applied by the present invention. This embodiment further involves an ICI estimation module 106 and an IBI estimation module 107.

The typical prior art may involve a PCP-OFDM system that works in a static multipath channel. Because of the dispersive nature of multipath channel, for one given received OFDM symbol region, there would be one OFDM symbol and two adjacent PCPs, that means ISI and inter-carrier interference (ICI) may be introduced. Therefore, to achieve a successful symbol demodulation process it may be necessary to operate cancellations to remove ISI as well as ICI.

In an embodiment of the present invention that involves a PCP-OFDM system, it may be possible to use N samples as the observation period (OP).

First, $c_{P1}$ and $c_{P2}$ may be defined as the received PCP sequences. Such definitions may include multiple definitions occurring immediately before, as well as after, the OFDM data part, $R_{c_{p1}}$ and $R_{c_{p2}}$ may be the zero-padded signal vectors of $C_{P1}$, $C_{P2}$.

$$R_{c_{p1}} = [\underbrace{0, \ldots, 0}_{(N-L+1) \text{Samples}}, \underbrace{c_{p1}(P-L+1), \ldots, c_{p1}(P-1)}_{(L-1) \text{Samples}}]^T \quad (31)$$

$$R_{c_{p2}} = [\underbrace{c_{p2}(0), \ldots, c_{p2}(L-2)}_{(L-1) \text{Samples}}, \underbrace{0, \ldots, 0}_{(N-L+1) \text{Samples}}]^T$$

Then two N×N matrices may be constructed for the ISI and ICI evaluation. The first matrix may represent the channel seen by the OFDM symbol as $$C = \begin{bmatrix} h_0 & 0 & \cdots & 0 & 0 & \cdots & 0 \\ h_1 & h_0 & \cdots & 0 & 0 & \cdots & 0 \\ \vdots & \vdots & \ddots & \vdots & \vdots & \ddots & 0 \\ h_{L-1} & h_{L-2} & \cdots & h_0 & 0 & \cdots & 0 \\ 0 & h_{L-1} & \cdots & h_1 & h_0 & \cdots & 0 \\ \vdots & \vdots & \ddots & \vdots & \vdots & \ddots & \vdots \\ 0 & 0 & \cdots & 0 & h_{L-1} & \cdots & h_0 \end{bmatrix}, \quad (32)$$

while the second represents the tail end of the channel's impulse response that generates ISI in the succeeding symbol.

$$C_T = \begin{bmatrix} 0 & \cdots & 0 & h_{L-1} & h_{L-2} & \cdots & h_1 \\ 0 & \cdots & 0 & 0 & h_{L-1} & \cdots & h_2 \\ \vdots & \ddots & \vdots & \vdots & & \ddots & \vdots \\ 0 & \cdots & 0 & 0 & 0 & \cdots & h_{L-1} \\ 0 & \cdots & 0 & 0 & 0 & \cdots & 0 \\ \vdots & \ddots & \vdots & \vdots & & \ddots & \vdots \\ 0 & \cdots & 0 & 0 & 0 & \cdots & 0 \end{bmatrix}, \quad (33)$$

The interesting property of those above two matrices is $$C + C_T = C_{cycl}, \quad (34)$$

$C_{cycl}$ is the "ideal" channel matrix which results in a cyclic convolution between the transmitted signal and the channel.

Based on (31)-(34), the N-sample received signal may be expressed in the observation period as $$r' = Cx + C_T Rc_{P1} + w'_N \quad (35)$$

the ideal received signal vector could be:

$$r_i = r_1 - C_T Rc_{P1} + C_T x, \quad (36)$$

where $$r_1 = [r'(P), \ldots, r'(P+N-1)]^T. \quad (37)$$

By using (36), the first step of the hybrid domain receiver in demodulating x may be achieved by the present invention. The ISI term may be achieved by subtracting the ISI $C_T Rc_{P1}$ from the preceding PCP sequence, so that it is removed and thereby cancelled. Moreover, should the error from the estimated channel be small enough, the ISI cancellation is reliable.

After ISI cancellation, one or more of the following may be required: removal of the ICI; or cyclic reconstruction of the received PCP-OFDM signal. In accordance with (36), this could be done iteratively as any attempt of ICI removal has to be based on a temporary decision for the OFDM symbol. The ICI cancellation is in time domain while the demodulation the OFDM symbol is in frequency domain, and the conversion of any signal from time to frequency domain, or from frequency to time domain, may depend on Fourier transformation. That means that the computation complexity of the iterative process may be enormous. To address this problem, the present invention may utilize a time-domain based ICI cancellation.

In one embodiment of the present invention, when $r_1$ is used for the demodulation, the remaining tail from the PCP-OFDM symbol is actually the cyclic signal structure that needs to reconstruct. The tail signal could be derived from the following vector, $$r_2 = [\underbrace{r(P+N), \ldots, r(P+N+L-2)}_{(L-1) Samples}, \underbrace{0, \ldots, 0}_{(N-L+1) Samples}]^T \quad (38)$$

When the signal component from the second PCP is subtracted from (13), the desired ICI signal could be $$n_{ICI} = r_2 - C_H c_{P2}. \quad (39)$$

where $C_H$ is the following given (N×N) matrix $$C_H = \begin{bmatrix} h_0 & 0 & \cdots & 0 & 0 & \cdots & 0 \\ h_1 & h_0 & \cdots & 0 & 0 & \cdots & 0 \\ \vdots & \vdots & \ddots & \vdots & \vdots & \ddots & 0 \\ h_{L-2} & h_{L-3} & \cdots & h_0 & 0 & \cdots & 0 \\ 0 & 0 & \cdots & 0 & 0 & \cdots & 0 \\ \vdots & \vdots & \ddots & \vdots & \vdots & \ddots & \vdots \\ 0 & 0 & \cdots & 0 & 0 & \cdots & 0 \end{bmatrix} \quad (40)$$

The ideal signal for demodulation can be derived by using $$r_i = r_1 - C_T Rc_{P1} + r_2 - C_H Rc_{P2}. \quad (41)$$

If the channel estimate is accurate, (41) could be expressed as $$r_i C_{cycl} \{F_N^H X\} + w_N. \quad (42)$$

Based on the traditional cyclic prefix-based OFDM system, in which $C_{cycl}$ can be diagonalized by N×N(I)FFT matrice, by applying a FFT matrix, (42) could be $$F_N r_i = F_N \{C_{cyc}\{F_N^H X\} + w_N\} = D_N(\tilde{H}_N)\tilde{X}. \quad (43)$$

where $D_N(\tilde{H}_N)$ is the N×N diagonal matrix with the estimated frequency domain transfer function as its diagonal elements. Finally, the zero-forcing demodulation process could be completed as $$\tilde{X} = D_N^{-1}(\tilde{H}_N) F_N r_i \quad (44)$$

Figure 9:
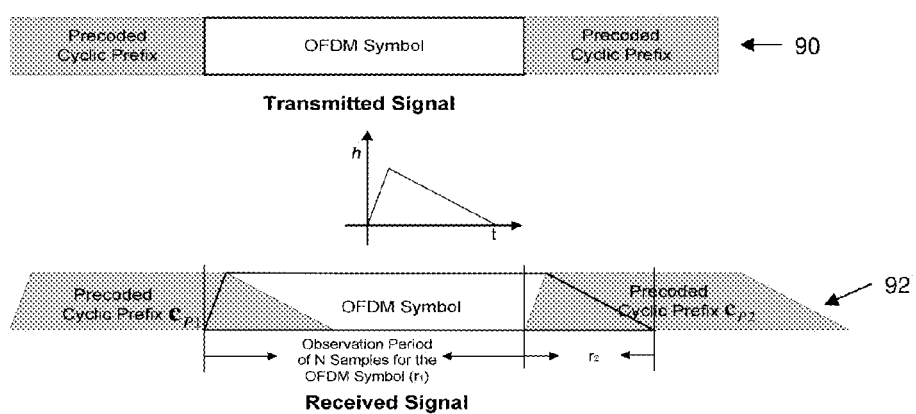
FIG. 9 shows an embodiment of the present invention incorporating signal propagation of one Orthogonal Frequency Division Multiplexing (OFDM) symbol with two Precoded Cyclic Prefixes (PCP).

As shown in FIG. 9, in one embodiment of the present invention, a transmitted signal 90 may incorporate an OFDM symbol situated between two PCPs. A received signal 92 may incorporate an OFDM symbol situated between a PCP ($C_{P1}$), and a PCP ($C_{P2}$). The OFDM and PCP aspects of the received signal may include tails and there may be overlap during an observation period of N Samples of the OFDM symbol ($r_1$).

Stealth Analysis

The stealth of an authentication communication system is the inability of the illegal users to distinguish between authenticated signals and un-authenticated information. The embodiment of the present invention, mathematic analyses of the feasibility as well as the stealth of the PCP-OFDM system may be applied. The former may involve measuring the orthogonality of the PCP sequences in time domain, the latter may involve measuring the similarity between the PCP signaling and the OFDM data.

As a first step in such analyses the orthogonality between two random selected PCP sequences $c_{p1}$ and $c_{p2}$ (denoted by $O_{p1,p2}$), which are orthogonal in frequency domain may be expressed as, $$O_{p1,p2} = c_{p1}^H c_{p2} \quad (45)$$

According to the transformation rules in (26), (45) could be re-arranged as $$\begin{aligned} O_{p1,p2} &= c_{p1}^H c_{p2} \\ &= (F_N^H C_{p1})^H F_N^H C_{p2} \\ &= C_{P1}^H F_N F_N^H C_{p2} \\ &= C_{P1}^H I C_{p2} \\ &= C_{P1}^H C_{p2} \end{aligned} \quad (46)$$

Based on (46) it may be possible to determine that $O_{p1,p2} = 0$. This determination may indicate that the two random orthogonal PCP sequences in time domain for the PCP- OFDM system of the present invention may be generated using orthogonal frequency domain input.

In an embodiment of the present invention, a comparison between the following may be undertaken to measure the stealth of the system of the present invention: probability density functions (PDF) of PCP; data-carrying part of the OFDM signal; and a typical OFDM sequence.

Due to the large number of the subcarriers used to generate PCP sequences in (1) and the OFDM signals utilized in (4), the real and imaginary parts of the signal may be modeled using a Gaussian distribution with probability density function (PDF) of $$f(x) = \frac{1}{\sigma\sqrt{2\pi}} \exp\left(\frac{-(x-\mu)^2}{2\sigma^2}\right) \quad (47)$$

In one embodiment of the present invention, different normalization factors in the IFFT matrix may be utilized for PCP and OFDM signals. As a result, the variance of the PCP signal and OFDM signal may be statistically identical. Consequently, the envelope of the PCP and OFDM signal may follow the Rayleigh distribution since $R=\sqrt{X^2+Y^2}$, where $x\sim N(0,\sigma^2)$ and $Y\sim N(0,\sigma^2)$. The probability density function (PDF) for Rayleigh distribution can be written as $$f(x;\sigma) = \frac{x}{\sigma^2} \exp\left(\frac{-x^2}{2\sigma^2}\right) \quad (48)$$

Robustness Analysis

The overall robustness of an embodiment of the present invention that incorporates a PCP-OFDM system may be evaluated based upon two factors: detection error rate probability for the signaling part (the PCP part); and the symbol error probability (SER) for the data-carrying part (the OFDM part). Therefore, the overall system robustness, could be measured as following, $$p_o \times p_e - (1-p_e)p_s \quad (49)$$

where $p_e$ is the detection error rate probability of PCP while $p_s$ is SER of the OFDM data detection.

The PCP sequences should be orthogonal with each other, therefore their correlation functions' values may only take on the values $[0,P\sigma]$, where P is the symbol length of one given PCP sequence and $\sigma$ is the standard deviation of the PCP signal.

The PCP's real and imaginary parts may be symmetrical which may allow the correlation of the locally generated PCP sequences and the real part of the received signal to form the basis for a calculation of the robustness of our PCP-OFDM system, which could be denoted by $$C(k_0) = \sum_{l=0}^{P-1} c_{p,m}(l)r(k_0+l) \quad (50)$$

where m is one of the locally generated PCP sequences, while $k_0$ is the time when synchronization is achieved. To simplify, the Gaussian Channel is used here and thus (25) could also be expressed as $$C(k_0) = \sum_{l=0}^{P-1} c_{p,m}(l)(c_{p,m}(l)+w_r(l)) \quad (51)$$

The analysis of the present invention may denote the correlation peak as A+n1, where A is the peak of the auto-correlation of the PCP sequence and n1 is the interference to the auto-correlation function at $k_0$. Here, the ideal auto-correlation peak is $M\sigma$ (the symbol length of PCP) plus n1, n1 is the interference to the auto-correlation function at k0, while the cross-correlation functions of the rest the rest of P1 sequences are 0+n2 and n2 is the interference to the cross-correlation function at k0. Both n1 and n2 are Gaussian distributed.

Based on the above discussions, the correct detection of the PCP should satisfy that $$P\sigma > n1+n2 \quad (52)$$

The detection error rate performance could be measured by the probability density function of a new random variable Y>n1+n2, which calculated as $$f_Y(y) = \int_{-\infty}^{\infty} f_{n1}(x)f_{n2}(y-x)dx \quad (53)$$

$$= \int_{-\infty}^{\infty} \frac{1}{\sigma_n\sqrt{2\pi}} e^{-\frac{x^2}{2\sigma_n^2}} \frac{1}{\sigma_n\sqrt{2\pi}} e^{-\frac{(y-x)^2}{2\sigma_n^2}} dx$$

$$= \frac{1}{2\sigma_n\sqrt{\pi}} e^{-\frac{y^2}{4\sigma_n^2}}$$

where $\sigma_n$ is the standard variance of n1 and n2. The relation between $\sigma_n$ and AWGN noise variance $\sigma_w^2$ can be determined from the correlation process. Thus, for a given cross-correlation function, the corresponding robustness could be measured as $$p_{e,m} = \int_{M\sigma}^{\infty} \frac{1}{2\sigma_n\sqrt{\pi}} e^{-\frac{y^2}{4\sigma_n^2}} dy \quad (54)$$

$$= Q\left(\frac{M\sigma}{\sqrt{2}\,\sigma_n}\right)$$

where $$Q(a) = \int_a^{\infty} \frac{1}{\sqrt{2\pi}} e^{-\frac{y^2}{2}} dy.$$

The overall PCP robustness, for example, such as the detection error rate, finally becomes $$p_e = 1-(1-p_{e,m})^{P-1} \quad (55)$$

Constrained Joint Optimization of OFDM System

In one embodiment of the present invention, the constraint from the system, including limited controlling channel capacity and different priorities for security and efficiency, may require that techniques for enhanced security and efficiency developed from the previous tasks may need to be integrated to generate a single solution operable to address the wireless security and resource utilization issues.

In one embodiment of the present invention, the physical-layer attributes gathered for authentication purpose, additional physical-layer information (for example, such as channel status) and future variation, may also be analyzed to determine information pertaining to the performance of the communication system. Effective adaptation of the communication system may require channel monitoring techniques to distinguish normal channel-induced signal to noise ratio (SNR) variations and abrupt change of SNR due to security threats or collision implications.

The present invention may generate precise long term channel predictions. Such precise long term channel predictions may be utilized to provide accurate channel prediction information for OFDM system adaptation.

Prior art existing channel predictors for OFDM primarily concentrate on frequency domain prediction. The prediction range of these existing channel predictors in frequency domain is often too short to be useful in the realistic scenarios.

The present invention may offer a benefit and advantage over the prior art in that the present invention may utilize a model based time domain channel prediction for the adaptation transmission parameters. A cluster-based time-domain channel predictor based on the distinct variation pattern in time-domain of each multipath cluster (MC). The variation pattern in time-domain of each MC may be identified and traced precisely if each is separated from the others.

In one embodiment of the present invention, a linear predictor may be utilized to trace the slow envelope variation, while a phase slope detector may be utilized to follow the phase changes for each MC. In order to further enhance the prediction accuracy, channel estimation noise may be mitigated by using a narrow band-pass filter, operating in the time domain and around the Doppler frequency peak for each MC.

A joint optimization procedure for improved security and resource utilization rate for OFDM adaptation, given limited controlling link capacity, may be applied by the present invention. The joint optimization procedure may involve appropriate objective functions. The objection functions may be utilized to maximize the secrecy capacity between two legitimate users and resource utilization rates simultaneously. The objective functions may be compared and the most promising objective function, as identified by the comparison, may be retained. The method of the system adaptation of the present invention may be determined from the joint optimization for enhanced security and efficiency.

Example

Numerical simulations have been conducted to quantify the performance of the present invention wireless security and authentication techniques based on PCP-OFDM. The demonstration OFDM system utilized in the simulations had an FFT size of 2048 and PCP duration of 512 samples, which is ¼ of the OFDM symbols duration. PCP-OFDM symbols were generated in the simulations utilizing an embodiment of the present invention as shown in FIG. 10a. To generate the orthogonal PCP sequences, m-sequences with different cyclic shift were used due to their low residue correlation coefficients.

Figure 12:
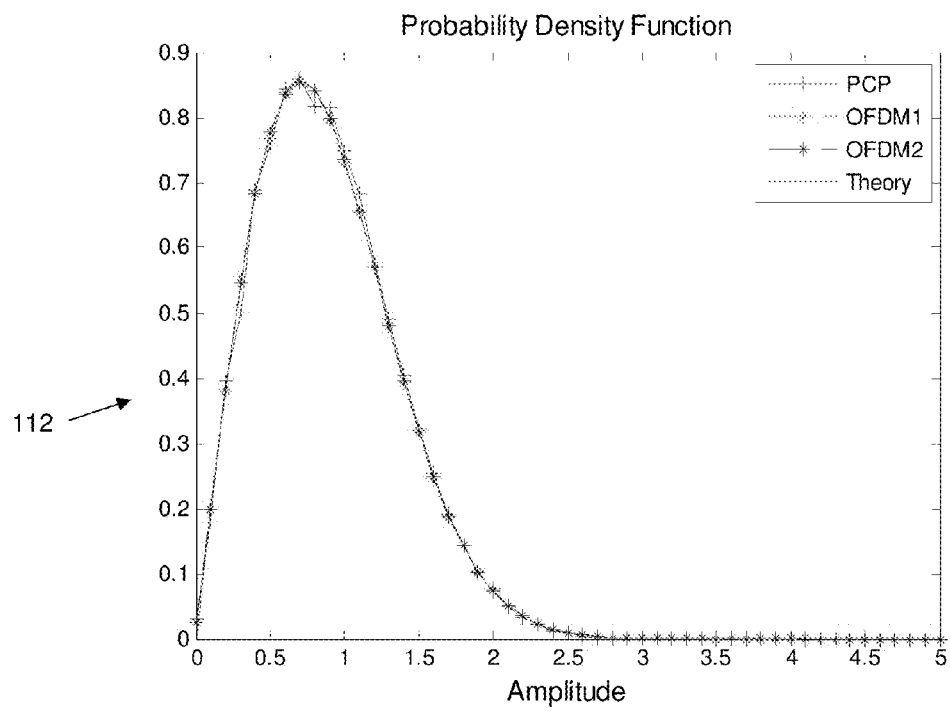
FIG. 12 is a graph showing time domain statistical properties of PCP sequence and OFDM data-carrying signal of an embodiment of the present invention.
Figure 13:
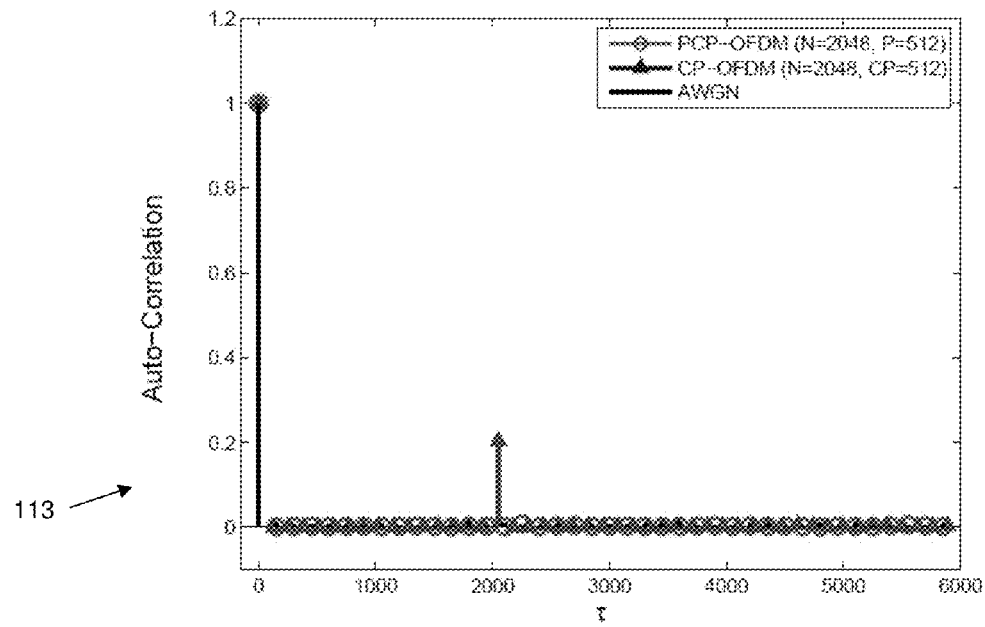
FIG. 13 is a graph showing auto-correlation of PCP-OFDM, Cyclic Prefix-Orthogonal Frequency Division Multiplexing (CP-OFDM) and Additive white Gaussian Noise (AWGN) of an embodiment of the present invention.

Time domain statistical properties of the PCP sequence and OFDM signals were investigated through numerical simulation. The probability density function of the PCP and OFDM signal amplitude was simulated, and the results are shown the table 112 shown in FIG. 12. The difference between the PCP and the OFDM data-carrying signal is minimal, as shown in FIG. 12, and each of the PCP and the OFDM data-carrying signal are very close to the theoretical Rayleigh distribution. The simulation therefore confirmed that PCP sequences share identical distribution with the OFDM signal on a signal envelope. On the other hand, autocorrelation functions of PCP-OFDM, CP-OFDM, and AWGN signals are shown in table 113 shown in FIG. 13. The PCP-OFDM signal had the same autocorrelation function as the Gaussian noise. Results of the simulations shown in FIGS. 12 and 13 further indicate that the PCP-OFDM signal has a very low interception probability.

Figure 14:
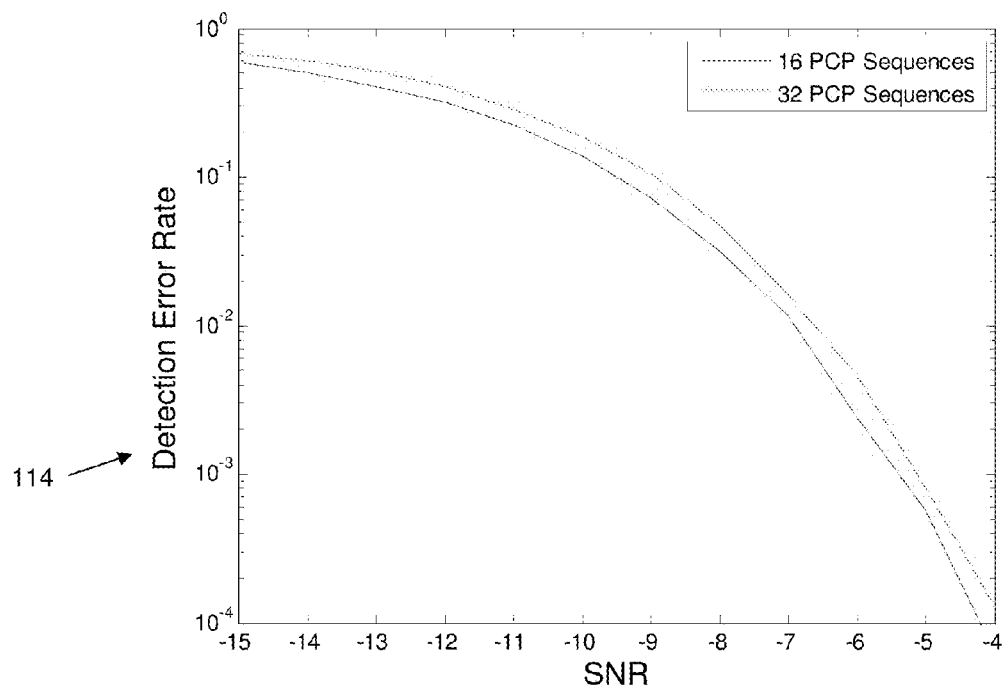
FIG. 14 is a graph showing CP sequence detection error rate for the proposed PCP-OFDM authentication technique of an embodiment of the present invention.

The PCP sequence detection error rate was also simulated and the results are shown in table 114 shown in FIG. 14. The PCP sequence detection error rate was evaluated to determine the robustness of the authentication technique of the present invention. Due to the fact that data recovery in the system of the present invention relies on the correction detection of the PCP information, a high level of robustness of PCP detection performance was expected.

An OFDM with 256 subcarrier and PCP duration of 64 was used in the simulation. Two scenarios with 32 different PCP sequences and 16 different PCP sequences were simulated. A high level of robustness of PCP detection was achieved (i.e., the PCP detection was very robust) at very low signal to noise ratio (SNR). The simulations indicated that the detection error rate may be as low as approximately $10^{-4}$ at −4 dB. This is very low SNR compared to the minimum SNR requirement for most prior art communication systems.

Figure 15:
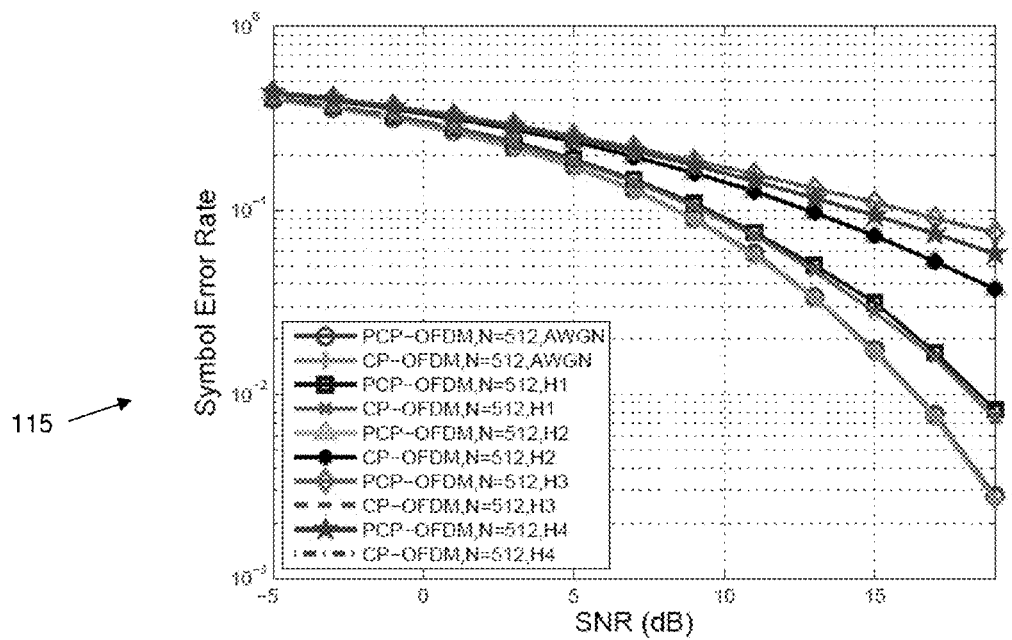
FIG. 15 is a graph showing symbol error probability of PCP-OFDM and CP-OFDM systems of an embodiment of the present invention.

Symbol error rate results of the simulations of the embodiment of the PCP-OFDM system of the present invention and a prior art traditional CP-OFDM system are shown as table 115 shown in FIG. 15. The symbol error rates reflect use of the dynamic PCP policy under 5 different channels. As a comparison, the robustness performance achieved by using a traditional prior rat CP-OFDM system was simulated as well. The traditional prior art CP durations were also adjusted corresponding to the PCP policy changes.

As shown in FIG. 15, the two sets of error probability curves are fully overlapped. Therefore, it was predicted that the crosslayer optimization based PCP-OFDM system could achieve the same robustness performance as the traditional CP-OFDM system. This means the PCP-OFDM system and CP-OFDM system have the virtually the same performance in system robustness at any reasonable SNR for a working wireless communication system.

The various methods explained and discussed above may be implemented as software and can be considered as steps in one or more methods. When implemented as software, the steps in the various methods can be executed by dedicated processing hardware or by general purpose processing units as are known in the art.

The method steps of the invention may be embodied in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory means such computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components. Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques).

The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

I claim:

1. An adaptive secure wireless communications system comprising:
   (a) at least two transceivers operable to receive at least one signal and to transmit at least one signal;
   (b) a physical-layer attributes monitoring module within each of said at least two transceivers, operable to estimate at least two physical-layer attributes from the at least one received signal;
   (c) one or more confidence testing modules within each of said at least two transceivers, operable to perform one or more tests, at least one of said one or more tests involving weighted combinations of the at least two physical-layer attributes in a single test on the at least one received signal;
   (d) an authentication controller module within each of said at least two transceivers, said authentication controller module being operable to determine adaptation of authentication of said at least one received signal between said at least two transceivers based on results of the one or more tests;
   (e) an adaptation communication module within each of said at least two transceivers, operable to adapt one or more parameters of the at least two transceivers in accordance with an authentication of the at least one received signal and one or more characteristics of the one or more of the at least two transceivers to enhance the security of the adaptive secure wireless communications system, an adaptation of said one or more parameters being initiated by said at least two transceivers; and
   (f) a security signaling generator module within each of said at least two transceivers for integrating concurrent or conjugated system adaptation information and security control information with a data-carrying signal and for coordinating said security control information between said at least two transceivers;
   wherein security threats to said at least one received signal are reduced and wherein said at least two transceivers authenticate and adapt the at least one received signal in a manner selected from:
   an interleaved manner;
   a continuous manner;
   a continuous and interleaved manner.

2. The system of claim 1 wherein said physical-layer attributes monitoring module monitors a communication session environment used by said at least two transceivers.

3. The system according to claim 1 wherein said at least one received signal comprises said data-carrying signal and at least one security information carrying signal, said data-carrying signal and said at least one security information carrying signal being generated such that said signals share identical statistical properties.

4. The system according to claim 3 wherein said at least one data-carrying signal and said at least one security information carrying signal are duplexed using at least one of frequency division duplexing (FDD) or time division duplexing (TDD) techniques.

5. The system according to claim 3 wherein security information carried by said at least one security information carrying signal is encoded into a precoded cyclic prefix (PCP) for orthogonal frequency division multiplexing (OFDM) signals.

6. The system according to claim 1 wherein said physical-layer attributes monitoring module monitors attributes relating to a propagation environment or to hardware involved in a communication process, said attributes being used by said authentication controller module to authenticate the at least one received signal.

7. The system according to claim 1 wherein at least one of the following is used for authentication of channels and signals and for enhancing security of communications between said at least two transceivers:
   channel variation,
   speed of channel variation,
   channel correlation in frequency and time domain,
   signal arrival angle,
   Doppler frequency,
   delay spread,
   sparsity,
   deviation from a predicted channel response,
   position of a transmitter,
   hardware characteristics of the transmitter,
   carrier frequency offset, and
   angle of arrival of a received communications signal.

8. The system according to claim 1 wherein said adaptive communication module adapts said one or more parameters of the at least two transceivers when said authentication controller module fails to authenticate the at least one received signal.

9. The system according to claim 8 wherein said adaptive communication module adapts said one or more parameters of the at least two transceivers according to a predetermined pattern defined by a predetermined security key.

10. The system according to claim 8 wherein said adaptive communication module adapts said one or more parameters of the at least two transceivers according to a variation pattern defined by a communication environment or hardware used in a communications between said at least two transceivers.

11. The system according to claim 3 wherein communication parameters are negotiated and exchanged between said at least two transceivers through said at least one security information carrying signal.

12. The system according to claim 11 wherein said communications parameters are negotiated and exchanged between said at least two transceivers when said adaptive communication module determines that operating parameters between said at least two transceivers need to be adapted.

13. The system according to claim 12 wherein said operating parameters includes at least one of the following:
   number of subcarriers,
   bandwidth,
   modulation scheme,
   coding scheme,
   power level,
   cyclic prefix duration of an OFDM signal, and
   cyclic shift of an OFDM signal.

14. A transceiver for use in communicating with a remote transceiver, the transceiver comprising:
   a) a physical-layer attributes monitoring module, operable to estimate at least two physical-layer attributes of at least one signal exchanged between said transceiver and said remote transceiver;
   b) one or more confidence testing modules, operable to perform one or more tests, at least one of said one or more tests involving weighted combinations of the at least two physical-layer attributes in a single test on said at least one signal;
   c) an authentication controller module to determine adaptation of authentication of said at least one signal between said transceiver and said remote transceiver based on results of the one or more tests;
   d) an adaptive communication module, operable to adapt one or more parameters of said transceiver in accordance with an authentication of the at least one signal and operable to adapt one or more characteristics of the transceiver to enhance a security of a communications channel between said transceiver and said remote transceiver, an adaptation of said one or more parameters being initiated by said transceiver; and
   e) a security signaling generator module for integrating concurrent or conjugated system adaptation information and security control information with a data-carrying signal and for exchanging said security control information between said transceiver and another transceiver wherein said transceiver authenticates and adapts the at least one signal in a manner selected from:
      an interleaved manner;
      a continuous manner;
      a continuous and interleaved manner.

15. The transceiver of claim 14 wherein said physical-layer attributes monitoring module monitors a communication session environment used by said transceiver and said remote transceiver.

16. The transceiver according to claim 14 wherein said at least one signal comprises said data-carrying signal and at least one security information carrying signal, said data-carrying signal and said at least one security information carrying signal being generated such that said signals have identical statistical properties.

17. The transceiver according to claim 14 wherein at least one of the following is used for authentication of channels and signals and for enhancing a security of communications between said transceiver and said remote transceiver:
   channel variation,
   speed of channel variation,
   channel correlation,
   signal arrival angle,
   Doppler frequency,
   delay spread,
   sparsity,
   deviation from a predicted channel response
   position of a transmitter,
   hardware characteristics of the transmitter,
   carrier frequency offset, and
   angle of arrival of a received communications signal.

18. The transceiver according to claim 14 wherein said adaptive communication module adapts at least one communication operating parameters of said transceiver when said authentication controller module fails to authenticate the at least one signal.

19. The transceiver according to claim 16 wherein communication parameters are negotiated and exchanged between said transceiver and said remote transceiver through said at least one security information carrying signal.

20. The transceiver according to claim 19 wherein said operating parameters includes at least one of the following:
   number of subcarriers,
   bandwidth,
   modulation scheme,
   coding scheme,
   power level,
   cyclic prefix duration of an OFDM signal, and
   cyclic shift of an OFDM signal.

* * * * *